United States Patent
Guo et al.

(10) Patent No.: US 12,119,909 B2
(45) Date of Patent: Oct. 15, 2024

(54) ADAPTIVE CSI REPORTING AND PRB BUNDLING IN AAS

(71) Applicant: Telefonaktiebolaget LM Ericsson (publ), Stockholm (SE)

(72) Inventors: Shiguang Guo, Kanata (CA); Shaohua Li, Kanata (CA); Yongquan Qiang, Ottawa (CA)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 363 days.

(21) Appl. No.: 17/619,632

(22) PCT Filed: Jun. 19, 2019

(86) PCT No.: PCT/IB2019/055180
§ 371 (c)(1),
(2) Date: Dec. 16, 2021

(87) PCT Pub. No.: WO2020/254858
PCT Pub. Date: Dec. 24, 2020

(65) Prior Publication Data
US 2022/0302978 A1   Sep. 22, 2022

(51) Int. Cl.
*H04B 7/06* (2006.01)
*H04W 72/0453* (2023.01)

(52) U.S. Cl.
CPC ...... *H04B 7/0626* (2013.01); *H04W 72/0453* (2013.01)

(58) Field of Classification Search
CPC .................................................. H04W 72/0453
See application file for complete search history.

(56) References Cited

U.S. PATENT DOCUMENTS

2011/0170435 A1*  7/2011  Kim ............... H04L 1/0693
                                                  370/252
2012/0287875 A1* 11/2012  Kim ............... H04L 5/0053
                                                  370/329
(Continued)

FOREIGN PATENT DOCUMENTS

EP    2568646 A1   3/2013
GB    2507570 A    5/2014
(Continued)

OTHER PUBLICATIONS

Author Unknown, "Technical Specification Group Radio Access Network; Evolved Universal Terrestrial Radio Access (E-UTRA); Physical channels and modulation (Release 15)," Technical Specification 36.211, Version 15.5.0, Mar. 2019, 3GPP Organizational Partners, 238 pages.

(Continued)

*Primary Examiner* — Gary Mui
(74) *Attorney, Agent, or Firm* — Sage Patent Group

(57) ABSTRACT

Embodiments of a method performed by a base station for adaptive Channel State Information (CSI) reporting configuration and/or Physical Resource Block (PRB) bundling and corresponding embodiments of a base station are disclosed. In some embodiments, a method performed by a base station comprises obtaining one or more parameters comprising one or more measurements of channel dispersiveness of a wireless channel between the base station and a User Equipment (UE), an uplink (UL) power-limited status of the UE, and/or an allocation bandwidth for the UE. The method further comprises selecting, based on the one or more parameters, a CSI report configuration for the UE and/or a PRB bundling configuration for the UE. The method further comprises transmitting, to the UE, information that indicates the (Continued)

selected CSI report configuration and/or information that indicates the selected PRB bundling configuration.

25 Claims, 15 Drawing Sheets

(56) References Cited

U.S. PATENT DOCUMENTS

| | | | | |
|---|---|---|---|---|
| 2013/0094384 | A1* | 4/2013 | Park | H04L 1/0026 370/252 |
| 2013/0315197 | A1* | 11/2013 | Park | H04L 1/0031 370/329 |
| 2017/0188350 | A1* | 6/2017 | Kim | H04W 4/70 |
| 2018/0145809 | A1* | 5/2018 | Kwak | H04L 5/0094 |
| 2018/0302140 | A1 | 10/2018 | Rahman et al. | |
| 2018/0310300 | A1* | 10/2018 | Lin | H04L 5/0053 |
| 2021/0203388 | A1* | 7/2021 | Tomeba | H04B 7/0617 |
| 2021/0297118 | A1* | 9/2021 | Kwak | H04B 7/0632 |

FOREIGN PATENT DOCUMENTS

| | | | |
|---|---|---|---|
| JP | 2016184853 | A | 10/2016 |
| WO | 2016179565 | A1 | 11/2016 |

OTHER PUBLICATIONS

Author Unknown, "Technical Specification Group Radio Access Network; Evolved Universal Terrestrial Radio Access (E-UTRA); Physical layer procedures (Release 15)," Technical Specification 36.213, Version 15.5.0, Mar. 2019, 3GPP Organizational Partners, 552 pages.
Author Unknown, "Technical Specification Group Radio Access Network; Evolved Universal Terrestrial Radio Access (E-UTRA); Radio Resource Control (RRC); Protocol specification (Release 9)," Technical Specification 36.331, Version 9.6.0, Mar. 2011, 3GPP Organizational Partners, 252 pages.
Author Unknown, "Technical Specification Group Radio Access Network; NR; Physical channels and modulation (Release 15)," Technical Specification 38.211, Version 15.5.0, Mar. 2019, 3GPP Organizational Partners, 96 pages.
Author Unknown, "Technical Specification Group Radio Access Network; NR; Physical layer procedures for data (Release 15)," Technical Specification 38.214, Version 15.3.0, Sep. 2018, 3GPP Organizational Partners, 96 bages.
Author Unknown, "Technical Specification Group Radio Access Network; NR; Radio Resource Control (RRC) protocol specification (Release 15)," Technical Specification 38.331, Version 15.3.0, Sep. 2018, 3GPP Organizational Partners, 445 pages.
Ericsson et al., "R2-093802: Providing per QCI radio link failure timers," 3GPP TSG-RAN WG2 #66bis, Jun. 29-Jul. 3, 2009, Los Angeles, California, 3 pages.
Office Action for Canadian Patent Application No. 3041946, mailed May 5, 2020, 4 pages.
Notice of Reasons for Rejection for Japanese Patent Application No. 2019-523078, mailed Jul. 14, 2020, 6 pages.
International Search Report and Written Opinion for International Patent Application No. PCT/IB2019/055180, mailed Feb. 25, 2020, 19 pages.

* cited by examiner

PRB bundling for big allocation

*PRB bundling for small allocation option 1*

*PRB bundling for small allocation option 2*

Precoding vector selection given different PMI reports

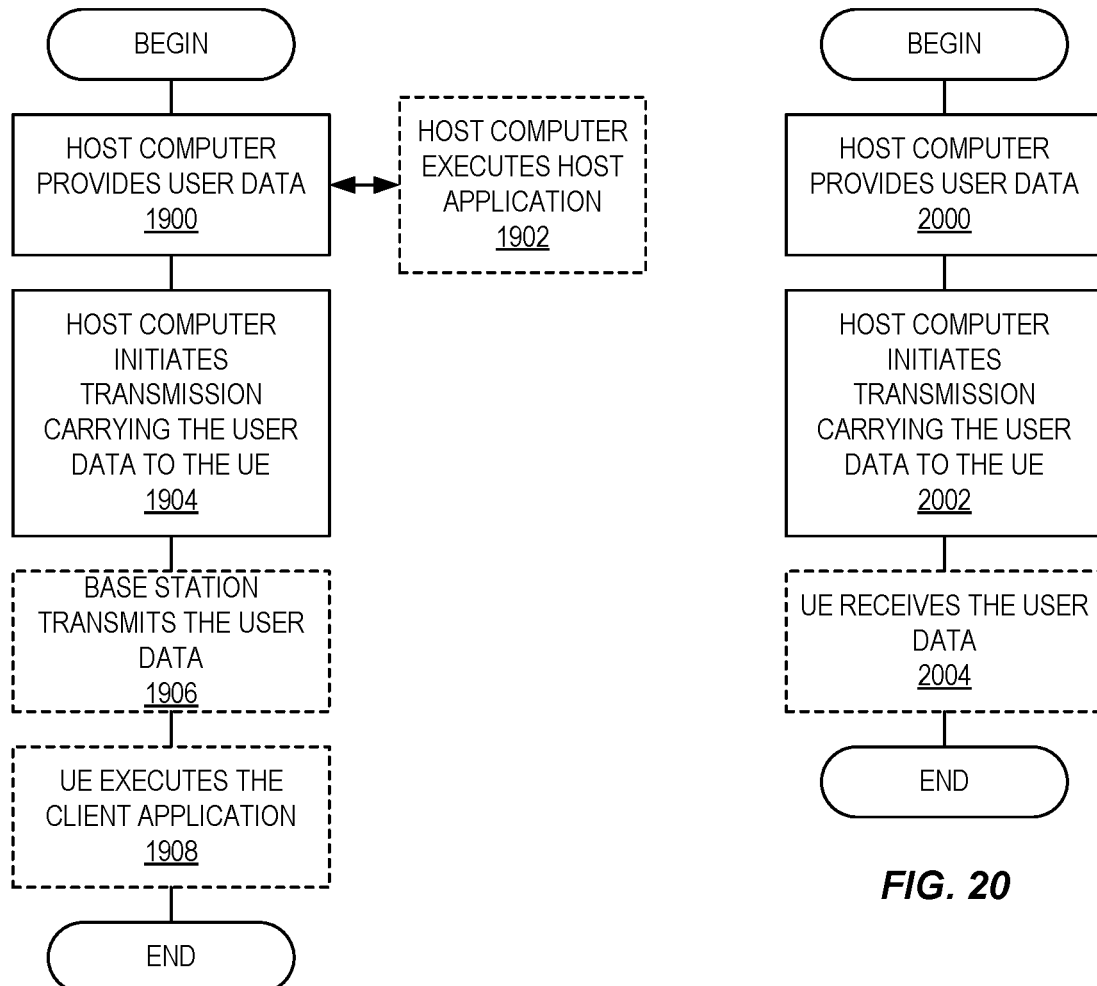

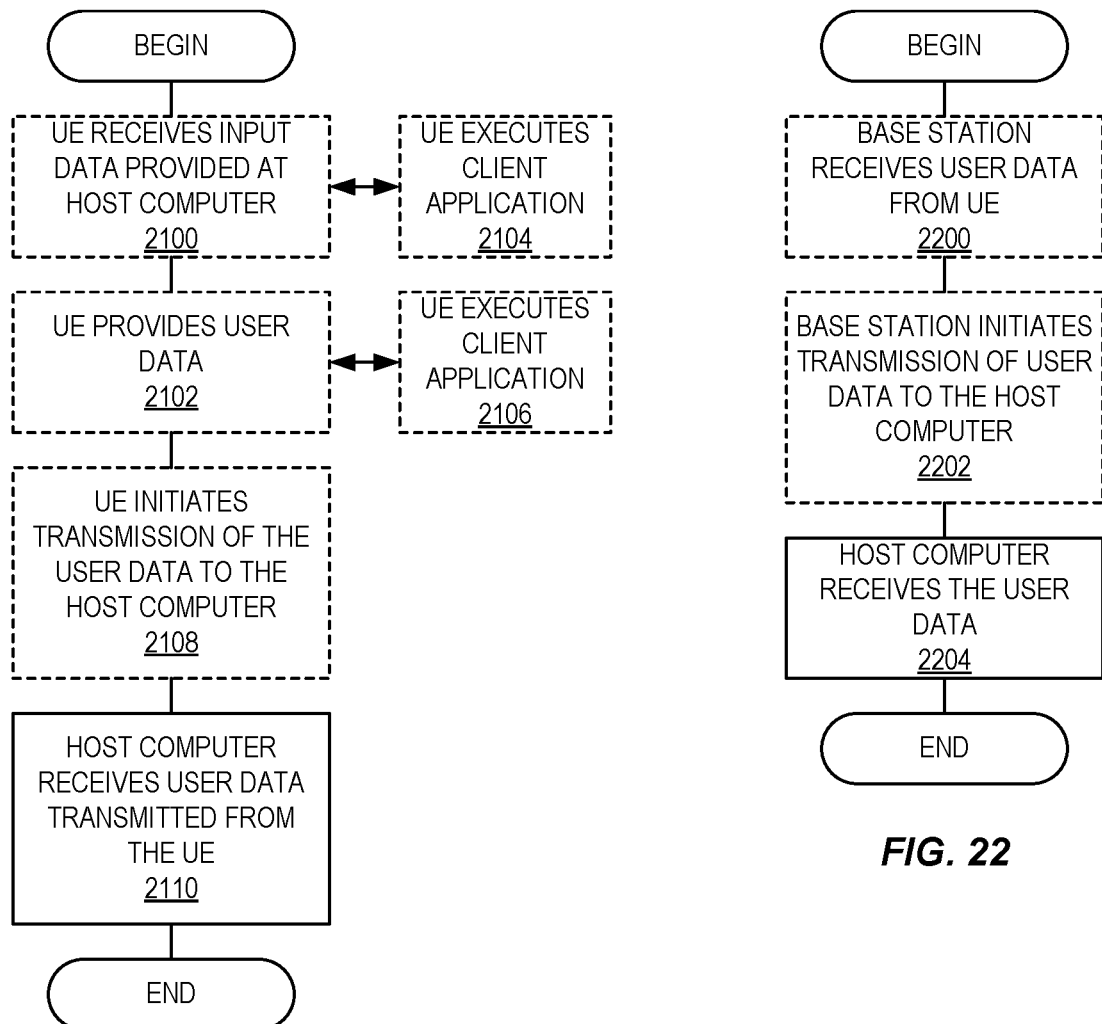

ADAPTIVE CSI REPORTING AND PRB BUNDLING IN AAS

This application is a 35 U.S.C. § 371 national phase filing of International Application No. PCT/IB2019/055180, filed Jun. 19, 2019, the disclosure of which is incorporated herein by reference in its entirety.

TECHNICAL FIELD

The present disclosure relates to Channel State Information (CSI) reporting and Physical Resource Block (PRB) bundling in a wireless communication system that includes an Active Antenna System (AAS).

BACKGROUND

AAS and Beamforming

Active Antenna System (AAS) is one of the key technologies adopted by Fourth Generation (4G) Long Term Evolution (LTE) and Fifth Generation (5G) New Radio (NR) to enhance the wireless network performance and capacity by using full dimension Multiple Input Multiple Output (MIMO), which is denoted as Full Dimension MIMO (FD-MIMO), or massive MIMO. A typical AAS system consists of a two-dimensional (2D) antenna element array with M rows, N columns, and K polarizations (K=2 in case of cross-polarization), as shown in FIG. 1.

Codebook-based precoding in AAS is based on a set of predefined precoding matrices. The Precoding Matrix Indication (PMI) may be selected by the User Equipment (UE) with the downlink (DL) Channel State Information (CSI) Reference Signal (CSI-RS) [1], or by the base station (i.e., the enhanced or evolved Node B (eNB) in LTE or the next generation Node B (gNB) in NR) with uplink (UL) reference signals.

The precoding matrix, denoted as W, may be further described as, for example, a two-stage precoding structure as follows:

$$W = W_1 W_2. \quad (1)$$

The first stage of the precoding structure, i.e., $W_1$, may be described as a codebook, and consists essentially of a group of 2D Grid-of-Beams (GoBs), which may be characterized as:

$$W_1 = \begin{bmatrix} w_h \otimes w_v & 0 \\ 0 & w_h \otimes w_v \end{bmatrix}$$

where $w_h$ and $w_v$ are precoding vectors selected from an over-sampled Discrete Fourier Transform (DFT) for the horizontal direction and the vertical direction, respectively, and may be expressed by $$w_h = \frac{1}{\sqrt{N}} \left[ 1, e^{\frac{j2\pi h}{NO_1}}, \ldots, e^{\frac{j2\pi n h}{NO_1}}, \ldots, e^{\frac{j2\pi(N-1)h}{NO_1}} \right]^T$$

$$w_v = \frac{1}{\sqrt{M}} \left[ 1, e^{\frac{j2\pi v}{MO_2}}, \ldots, e^{\frac{j2\pi m v}{MO_2}}, \ldots, e^{\frac{j2\pi(M-1)v}{MO_2}} \right]^T$$

where $O_1$ and $O_2$ are the over-sampling rate in horizontal and vertical directions, respectively. Note that "h" is the index for the horizontal direction where h=0, 1, 2, . . . , and "v" is the index for the vertical direction where v=0, 1, 2, . . . . Thus, the precoding vector $w_h$ can be expressed as:

$$w_h = w_0, w_1, \ldots, w_{M-1}$$

where, e.g., $$w_0 = \frac{1}{\sqrt{N}} \left[ 1, e^{\frac{j2\pi 0}{NO_1}}, \ldots, e^{\frac{j2\pi n 0}{NO_1}}, \ldots, e^{\frac{j2\pi(N-1)0}{NO_1}} \right]^T$$

and $$w_1 = \frac{1}{\sqrt{N}} \left[ 1, e^{\frac{j2\pi 1}{NO_1}}, \ldots, e^{\frac{j2\pi n 1}{NO_1}}, \ldots, e^{\frac{j2\pi(N-1)1}{NO_1}} \right]^T$$

etc.

The precoding vector $w_v$ for the vertical direction can be expressed in a similar manner. The second stage of the precoding matrix, i.e. $W_2$, is used for beam selection within the group of 2D GoBs as well as the associated co-phasing between two polarizations.

In NR, $W_1$ is determined according to UE PMI report of i1. $W_2$ is determined according to UE PMI report of i2. Both i1 and i2 are components of the UE PMI report, as specified in the NR standards. The UE will feed back the PMI report to the gNB, and the gNB will apply a corresponding precoder for the DL transmission after receiving the UE PMI report.

FIG. 2 illustrates closed-loop MIMO. As shown in FIG. 2, for closed-loop MIMO, the gNB sends CSI report settings and Physical Resource Block (PRB) bundling configurations to the UE. The UE will report CSI, including PMI, to the gNB. The gNB derives $W_1$ and $W_2$ from the CSI report.

CSI Reporting

In NR, the UE measures both Channel Quality Information (CQI) and PMI using CSI-RS and reports the result back to the gNB as part of the CSI in any of the following three ways:

1. aperiodic CSI reporting triggered by Downlink Control Information (DCI),
2. CSI reporting scheduled by semi-persistent scheduling, or
3. Periodic CSI reporting.

The UE can be configured to measure and report either subband CQI or wideband CQI. When wideband CQI is configured, the UE reports a wideband CQI index that is in the range of and including 0 to 15. When subband CQI is configured, the UE reports a wideband CQI index together with a separate subband differential CQI value for each subband. The subband size is configured by the gNB. Likewise, the UE can be configured to measure and report either subband PMI or wideband PMI. When wideband PMI is configured, the UE reports a wideband PMI index i1 and a wideband PMI index i2. When subband PMI is configured, the UE reports a wideband PMI index i1 together with multiple subband PMI indices i2 (i.e., separate i2 value for each subband). The number of subband PMI indices i2 is determined by the subband size and bandwidth.

CSI reports are reported to the gNB using the Physical Uplink Shared Channel (PUSCH). Wideband CSI will have a smaller payload size compared to subband CSI. Therefore, subband CSI will use more PUSCH resources as compared to wideband CSI.

There are four combinations of CQI and PMI depending on CQI format and PMI format as shown in the Table 1 below.

TABLE 1

Supported CSI report configuration

| CSI Report Config ID | CQI format | PMI format |
|---|---|---|
| 0 | Wideband | Wideband |
| 1 | Subband | Wideband |
| 2 | Wideband | Subband |
| 3 | Subband | Subband |

Multiple CSI reporting settings (each setting corresponds to a CSI Report Config Identifier (ID)) can be configured for a UE through a Radio Resource Control (RRC) message. The gNB can then select each reporting setting dynamically using DCI.

PRB Bundling

The gNB applies either subband PRB bundling or wideband PRB bundling. For each PRB bundle, the UE assumes that the same precoder is applied such that channel estimation can be averaged in each PRB bundle. The bundling size to use is decided by the gNB. The PRB bundling selection is indicated to the UE via DCI per DL grant dynamically.

SUMMARY

Systems and methods are disclosed herein for adaptive Channel State Information (CSI) reporting configuration and/or Physical Resource Block (PRB) bundling in a wireless communications system that utilizes an Active Antenna System (AAS). Embodiments of a method performed by a base station for adaptive CSI reporting configuration and/or PRB bundling and corresponding embodiments of a base station are disclosed. In some embodiments, a method performed by a base station for adaptive CSI reporting configuration and/or PRB bundling comprises obtaining one or more parameters comprising: (a) one or more measurements of channel dispersiveness of a wireless channel between the base station and a User Equipment (UE), (b) an uplink (UL) power-limited status of the UE, (c) an allocation bandwidth for the UE, or a combination of two or more of (a), (b), and (c). The method further comprises selecting, based on the one or more parameters, a CSI report configuration for the UE, a PRB bundling configuration for the UE, or both the CSI report configuration for the UE and the PRB bundling configuration for the UE. The method further comprises transmitting, to the UE, information that indicates the selected CSI report configuration, information that indicates the selected PRB bundling configuration, or both the information that indicates the selected CSI report configuration and the information that indicates the selected PRB bundling configuration.

In some embodiments, the one or more parameters comprise one or more measurements of channel dispersiveness of the wireless channel and the one or more measurements of the channel dispersiveness of the wireless channel comprise a measurement of a long-term channel dispersiveness of the wireless channel, a measurement of instantaneous channel dispersiveness of the wireless channel, or both a measurement of a long-term channel dispersiveness of the wireless channel and a measurement of instantaneous channel dispersiveness of the wireless channel.

In some embodiments, the one or more parameters further comprise the UL power-limited status of the UE. Further, selecting the CSI report configuration for the UE, the PRB bundling configuration for the UE, or both the CSI report configuration for the UE and the PRB bundling configuration for the UE comprises determining that the UE is UL power-limited based on the UL power-limited status of the UE; and, upon determining that the UE is UL power-limited, selecting wideband CSI reporting for the CSI report configuration.

In some embodiments, the one or more measurements of the channel dispersiveness of the wireless channel comprise a measurement of long-term channel dispersiveness of the wireless channel, and the one or more parameters further comprise the UL power-limited status of the UE and a timer for subband reporting. Further, selecting the CSI report configuration for the UE, the PRB bundling configuration for the UE, or both the CSI report configuration for the UE and the PRB bundling configuration for the UE comprises determining that the UE is not UL power-limited based on the UL power-limited status of the UE, determining that the measurement of long-term channel dispersiveness of the wireless channel is less than a predefined or preconfigured threshold, determining that the timer for subband reporting has not expired, and selecting wideband CSI reporting for the CSI report configuration upon determining that the UE is not UL power-limited, determining that the measurement of long-term channel dispersiveness of the wireless channel is less than the predefined or preconfigured threshold, and determining that the timer for subband reporting has not expired.

In some embodiments, the one or more measurements of the channel dispersiveness of the wireless channel comprise a measurement of long-term channel dispersiveness of the wireless channel, and the one or more parameters further comprise the UL power-limited status of the UE. Further, selecting the CSI report configuration for the UE, the PRB bundling configuration for the UE, or both the CSI report configuration for the UE and the PRB bundling configuration for the UE comprises determining that the UE is not UL power-limited based on the UL power-limited status of the UE, determining that the measurement of long-term channel dispersiveness of the wireless channel is not less than a predefined or preconfigured threshold, and selecting subband CSI reporting for the CSI report configuration upon determining that the UE is not UL power-limited and determining that the measurement of long-term channel dispersiveness of the wireless channel is not less than the predefined or preconfigured threshold.

In some embodiments, the one or more measurements of the channel dispersiveness of the wireless channel comprise a measurement of long-term channel dispersiveness of the wireless channel, and the one or more parameters further comprise the UL power-limited status of the UE and a timer for subband reporting. Further, selecting the CSI report configuration for the UE, the PRB bundling configuration for the UE, or both the CSI report configuration for the UE and the PRB bundling configuration for the UE comprises determining that the UE is not UL power-limited based on the UL power-limited status of the UE, determining that the measurement of long-term channel dispersiveness of the wireless channel is less than a predefined or preconfigured threshold, determining that the timer for subband reporting has expired, and selecting subband CSI reporting for the CSI report configuration upon determining that the UE is not UL power-limited, determining that the measurement of long-term channel dispersiveness of the wireless channel is less than the predefined or preconfigured threshold, and determining that the timer for subband reporting has expired.

In some embodiments, the UE is a UE for which the base station has scheduled a downlink (DL) transmission having a corresponding allocation bandwidth, the one or more measurements of the channel dispersiveness of the wireless channel comprise a measurement of long-term channel dispersiveness of the wireless channel, and the one or more parameters further comprise the corresponding allocation bandwidth. Further, selecting the CSI report configuration for the UE, the PRB bundling configuration for the UE, or both the CSI report configuration for the UE and the PRB bundling configuration for the UE comprises determining that the corresponding allocation bandwidth is greater than a first predefined or preconfigured threshold, determining that the measurement of long-term channel dispersiveness is available, determining that the measurement of long-term channel dispersiveness of the wireless channel is less than a second predefined or preconfigured threshold, and selecting wideband PRB bundling upon determining that the corresponding allocation bandwidth is greater than the first predefined or preconfigured threshold, determining that the measurement of long-term channel dispersiveness is available, and determining that the measurement of long-term channel dispersiveness of the wireless channel is less than the second predefined or preconfigured threshold. In some embodiments, the method further comprises applying one of two or more subband Precoding Matrix Indicators (PMIs) in the previous PMI reported by the UE as a wideband PMI for the DL transmission to the UE.

In some embodiments, the UE is a UE for which the base station has scheduled a DL transmission having a corresponding allocation bandwidth, the one or more measurements of the channel dispersiveness of the wireless channel comprise a measurement of long-term channel dispersiveness of the wireless channel, and the one or more parameters further comprise the corresponding allocation bandwidth. Further, selecting the CSI report configuration for the UE, the PRB bundling configuration for the UE, or both the CSI report configuration for the UE and the PRB bundling configuration for the UE comprises determining that the corresponding allocation bandwidth is greater than a first predefined or preconfigured threshold, determining that the measurement of long-term channel dispersiveness is available, determining that the measurement of long-term channel dispersiveness of the wireless channel is not less than a second predefined or preconfigured threshold, and selecting subband PRB bundling upon determining that the corresponding allocation bandwidth is greater than the first predefined or preconfigured threshold, determining that the measurement of long-term channel dispersiveness is available, and determining that the measurement of long-term channel dispersiveness of the wireless channel is not less than the second predefined or preconfigured threshold.

In some embodiments, the UE is a UE for which the base station has scheduled a DL transmission having a corresponding allocation bandwidth, the one or more measurements of the channel dispersiveness of the wireless channel comprise a measurement of long-term channel dispersiveness of the wireless channel, and the one or more parameters further comprise the corresponding allocation bandwidth. Further, selecting the CSI report configuration for the UE, the PRB bundling configuration for the UE, or both the CSI report configuration for the UE and the PRB bundling configuration for the UE comprises determining that the corresponding allocation bandwidth is greater than a first predefined or preconfigured threshold, determining that the measurement of long-term channel dispersiveness is not available, and selecting wideband PRB bundling upon determining that the corresponding allocation bandwidth is greater than the first predefined or preconfigured threshold and determining that the measurement of long-term channel dispersiveness is not available.

In some embodiments, the UE is a UE for which the base station has scheduled a DL transmission having a corresponding allocation bandwidth, and the one or more parameters further comprise the corresponding allocation bandwidth. Further, selecting the CSI report configuration for the UE, the PRB bundling configuration for the UE, or both the CSI report configuration for the UE and the PRB bundling configuration for the UE comprises determining that the corresponding allocation bandwidth is not greater than a first predefined or preconfigured threshold, and selecting wideband PRB bundling upon determining that the corresponding allocation bandwidth is not greater than the first predefined or preconfigured threshold. In some embodiments, a previous PMI report from the UE is a subband PMI report, and the method further comprises applying one of two or more subband PMIs in the previous PMI reported by the UE as a wideband PMI for the DL transmission to the UE.

In some embodiments, the UE is a UE for which the base station has scheduled a DL transmission having a corresponding allocation bandwidth, the one or more measurements of the channel dispersiveness of the wireless channel comprise a measurement of instantaneous channel dispersiveness of the wireless channel, and the one or more parameters further comprise the corresponding allocation bandwidth. Further, selecting the CSI report configuration for the UE, the PRB bundling configuration for the UE, or both the CSI report configuration for the UE and the PRB bundling configuration for the UE comprises determining that the corresponding allocation bandwidth is not greater than a first predefined or preconfigured threshold, determining that the instantaneous channel dispersiveness of the wireless channel is less than a predefined or preconfigured threshold, and selecting wideband PRB bundling upon determining that the corresponding allocation bandwidth is not greater than the first predefined or preconfigured threshold and determining that the instantaneous channel dispersiveness of the wireless channel is less than the predefined or preconfigured threshold. In some embodiments, a previous PMI report from the UE is a subband PMI report, and the method further comprises applying one of two or more subband PMIs in the previous PMI reported by the UE as a wideband PMI for the DL transmission to the UE.

In some embodiments, the UE is a UE for which the base station has scheduled a DL transmission having a corresponding allocation bandwidth, the one or more measurements of the channel dispersiveness of the wireless channel comprise a measurement of instantaneous channel dispersiveness of the wireless channel, and the one or more parameters further comprise the corresponding allocation bandwidth. Further, selecting the CSI report configuration for the UE, the PRB bundling configuration for the UE, or both the CSI report configuration for the UE and the PRB bundling configuration for the UE comprises determining that the corresponding allocation bandwidth is not greater than a first predefined or preconfigured threshold, determining that the instantaneous channel dispersiveness of the wireless channel is not less than a predefined or preconfigured threshold, and selecting subband PRB bundling upon determining that the corresponding allocation bandwidth is not greater than the first predefined or preconfigured threshold and determining that the instantaneous channel dispersiveness of the wireless channel is not less than the predefined or preconfigured threshold.

In some embodiments, the one or more measurements of the channel dispersiveness of the wireless channel comprise a measurement of a long-term channel dispersiveness of the wireless channel, and obtaining the one or more parameters comprise obtaining the measurement of the long-term channel dispersiveness of the wireless channel based on subband PMI reports received from the UE, subband Channel Quality Information (CQI) reports received from the UE, or measurements of UL transmissions from the UE, the UL transmissions comprising Sounding Reference Signals (SRSs) from the UE, Demodulation Reference Signals (DMRSs) from the UE, or beam transmissions from the UE.

In some embodiments, the one or more measurements of the channel dispersiveness of the wireless channel comprise a measurement of a long-term channel dispersiveness of the wireless channel, and obtaining the one or more parameters comprise obtaining the measurement of the long-term channel dispersiveness of the wireless channel. Further, obtaining the measurement of the long-term channel dispersiveness of the wireless channel comprises computing, within a defined time window, two or more Root Mean Squared (RMS) subband PMI values from corresponding subband PMI values reported by the UE across a full carrier bandwidth and averaging the two or more RMS subband PMI values to provide an averaged RMS subband PMI value, the averaged RMS subband PMI value being the measurement of the long-term channel dispersiveness of the wireless channel.

In some embodiments, the one or more measurements of the channel dispersiveness of the wireless channel comprise a measurement of a long-term channel dispersiveness of the wireless channel, and obtaining the one or more parameters comprise obtaining the measurement of the long-term channel dispersiveness of the wireless channel. Further, obtaining the measurement of the long-term channel dispersiveness of the wireless channel comprises computing a variation of subband PMIs reported by the UE, the variation of the subband PMIs being the measurement of the long-term channel dispersiveness of the wireless channel.

In some embodiments, the UE is a UE for which the base station has scheduled a DL transmission having a corresponding allocation bandwidth. Further, in some embodiments, the one or more parameters comprise the one or more measurements of the channel dispersiveness of the wireless channel and the corresponding allocation bandwidth.

In some embodiments, the one or more parameters comprise the one or more measurements of the channel dispersiveness of the wireless channel, the corresponding allocation bandwidth, and the UL power-limited status of the UE.

In some embodiments, the one or more measurements of the channel dispersiveness of the wireless channel comprise a measurement of an instantaneous channel dispersiveness of the wireless channel across the corresponding allocation bandwidth. Further, in some embodiments, obtaining the one or more parameters comprises obtaining the measurement of the instantaneous channel dispersiveness of the wireless channel across the corresponding allocation bandwidth based on a subband PMI report received from the UE, a subband CQI report received from the UE, or measurements of UL transmissions from the UE, the UL transmissions comprising SRSs from the UE, DMRSs from the UE, or beam transmissions from the UE.

In some embodiments, obtaining the one or more parameters comprises obtaining the measurement of the instantaneous channel dispersiveness of the wireless channel across the corresponding allocation bandwidth. Further, obtaining the measurement of the instantaneous channel dispersiveness of the wireless channel across the corresponding allocation bandwidth comprises computing a RMS subband PMI value from subband PMI values reported by the UE for subbands within the corresponding allocation bandwidth, the RMS subband PMI value being the measurement of the instantaneous channel dispersiveness of the wireless channel across the corresponding allocation bandwidth.

Embodiments of a base station configured to communicate with a UE are also disclosed. In some embodiments, a base station is adapted to obtain one or more parameters comprising: (a) one or more measurements of channel dispersiveness of a wireless channel between the base station and a UE, (b) a UL power-limited status of the UE, (c) an allocation bandwidth for the UE, or a combination two or more of (a), (b), and (c). The base station is further adapted to select, based on the one or more parameters, a CSI report configuration for the UE, a PRB bundling configuration for the UE, or both the CSI report configuration for the UE and the PRB bundling configuration for the UE. The base station is further adapted to transmit, to the UE, information that indicates the selected CSI report configuration, information that indicates the selected PRB bundling configuration, or both the information that indicates the selected CSI report configuration and the information that indicates the selected PRB bundling configuration.

In some embodiments, the base station comprises a network interface and processing circuitry associated with the network interface. The processing circuitry is configured to cause the base station to obtain the one or more parameters; select, based on the one or more parameters, a CSI report configuration for the UE, a PRB bundling configuration for the UE, or both the CSI report configuration for the UE and the PRB bundling configuration for the UE; and transmit, to the UE, information that indicates the selected CSI report configuration, information that indicates the selected PRB bundling configuration, or both the information that indicates the selected CSI report configuration and the information that indicates the selected PRB bundling configuration.

BRIEF DESCRIPTION OF THE DRAWINGS

The accompanying drawing figures incorporated in and forming a part of this specification illustrate several aspects of the disclosure, and together with the description serve to explain the principles of the disclosure.

FIG. 19 is a flowchart illustrating a method implemented in a communication system in accordance with one embodiment of the present disclosure;

FIG. 20 is a flowchart illustrating a method implemented in a communication system in accordance with one embodiment of the present disclosure;

FIG. 21 is a flowchart illustrating a method implemented in a communication system in accordance with one embodiment on the present disclosure; and FIG. 22 is a flowchart illustrating a method implemented in a communication system in accordance with one embodiment of the present disclosure.

DETAILED DESCRIPTION

Figure 1:
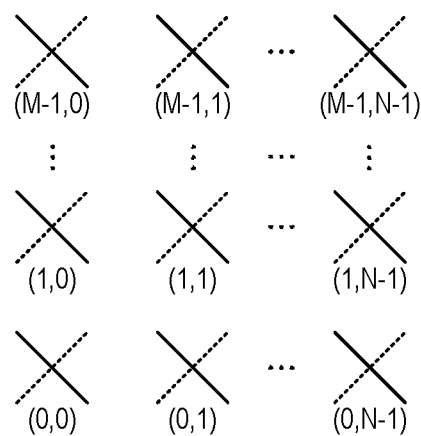
FIG. 1 is a diagram of a two-dimensional (2D) antenna element array.
Figure 2:
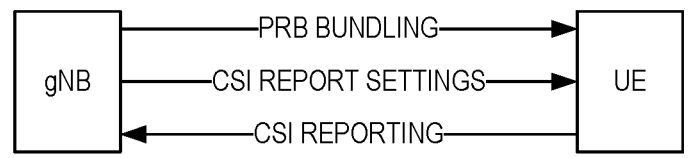
FIG. 2 illustrates an example of closed-loop Multiple Input Multiple Output (MIMO)

The embodiments set forth below represent information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure.

Radio Node: As used herein, a "radio node" is either a radio access node or a wireless device.

Radio Access Node: As used herein, a "radio access node" or "radio network node" is any node in a Radio Access Network (RAN) of a cellular communications network that operates to wirelessly transmit and/or receive signals. Some examples of a radio access node include, but are not limited to, a base station (e.g., a New Radio (NR) base station (gNB) in a Third Generation Partnership Project (3GPP) Fifth Generation (5G) NR network or an enhanced or evolved Node B (eNB) in a 3GPP Long Term Evolution (LTE) network), a high-power or macro base station, a low-power base station (e.g., a micro base station, a pico base station, a home eNB, or the like), and a relay node.

Core Network Node: As used herein, a "core network node" is any type of node in a core network. Some examples of a core network node include, e.g., a Mobility Management Entity (MME), a Packet Data Network Gateway (P-GW), a Service Capability Exposure Function (SCEF), or the like.

Wireless Device: As used herein, a "wireless device" is any type of device that has access to (i.e., is served by) a cellular communications network by wirelessly transmitting and/or receiving signals to a radio access node(s). Some examples of a wireless device include, but are not limited to, a User Equipment device (UE) in a 3GPP network and a Machine Type Communication (MTC) device.

Network Node: As used herein, a "network node" is any node that is either part of the RAN or the core network of a cellular communications network/system.

Note that the description given herein focuses on a 3GPP cellular communications system and, as such, 3GPP terminology or terminology similar to 3GPP terminology is oftentimes used. However, the concepts disclosed herein are not limited to a 3GPP system.

Note that, in the description herein, reference may be made to the term "cell"; however, particularly with respect to 5G NR concepts, beams may be used instead of cells and, as such, it is important to note that the concepts described herein are equally applicable to both cells and beams.

There currently exist a number of challenges in both LTE and NR with respect to Channel State Information (CSI) configuration and Physical Resource Block (PRB) bundling. More specifically, in the case of a highly dispersive channel condition where frequency selectivity is high, subband CSI reporting provides better downlink (DL) beamforming than wideband CSI reporting. However, the overhead in the uplink (UL) could be high when using subband CSI reporting, especially when the UE is power-limited. In this situation, the Physical Uplink Shared Channel (PUSCH) PRB resource is limited and the excessive overhead could result in very low UL UE throughput, which will impact UL coverage. This is a performance tradeoff between DL and UL.

For DL Physical Downlink Shared Channel (PDSCH) channel estimation, wideband PRB bundling will be preferred since averaging over more PRBs will improve channel estimation accuracy. However, wideband PRB bundling might not be optimal for beamforming performance in case of dispersive channels. This is a tradeoff between channel estimation and beamforming.

The optimal CSI reporting configuration and optimal PRB bundling configuration depends on factors such the dispersiveness of the channel, the allocation bandwidth, and whether the UE is power-limited. As such, a static CSI reporting configuration and a static PRB bundling configuration is not optimal.

Systems and methods are disclosed herein for adaptive CSI reporting configuration and PRB bundling. In some embodiments, the CSI reporting configuration and the PRB bundling are adaptively configured based on one or more factors. Preferably, these factors include long-term channel dispersiveness, instantaneous channel dispersiveness, and allocation bandwidth. As used herein, "channel dispersiveness" refers to channel variation over frequency, over time, or over both frequency and time. In some embodiments, channel dispersiveness over frequency is considered when adaptively configuring CSI reporting and PRB bundling. However, in some other embodiments, both channel dispersiveness over frequency and channel dispersiveness over time may be considered.

Figure 3:
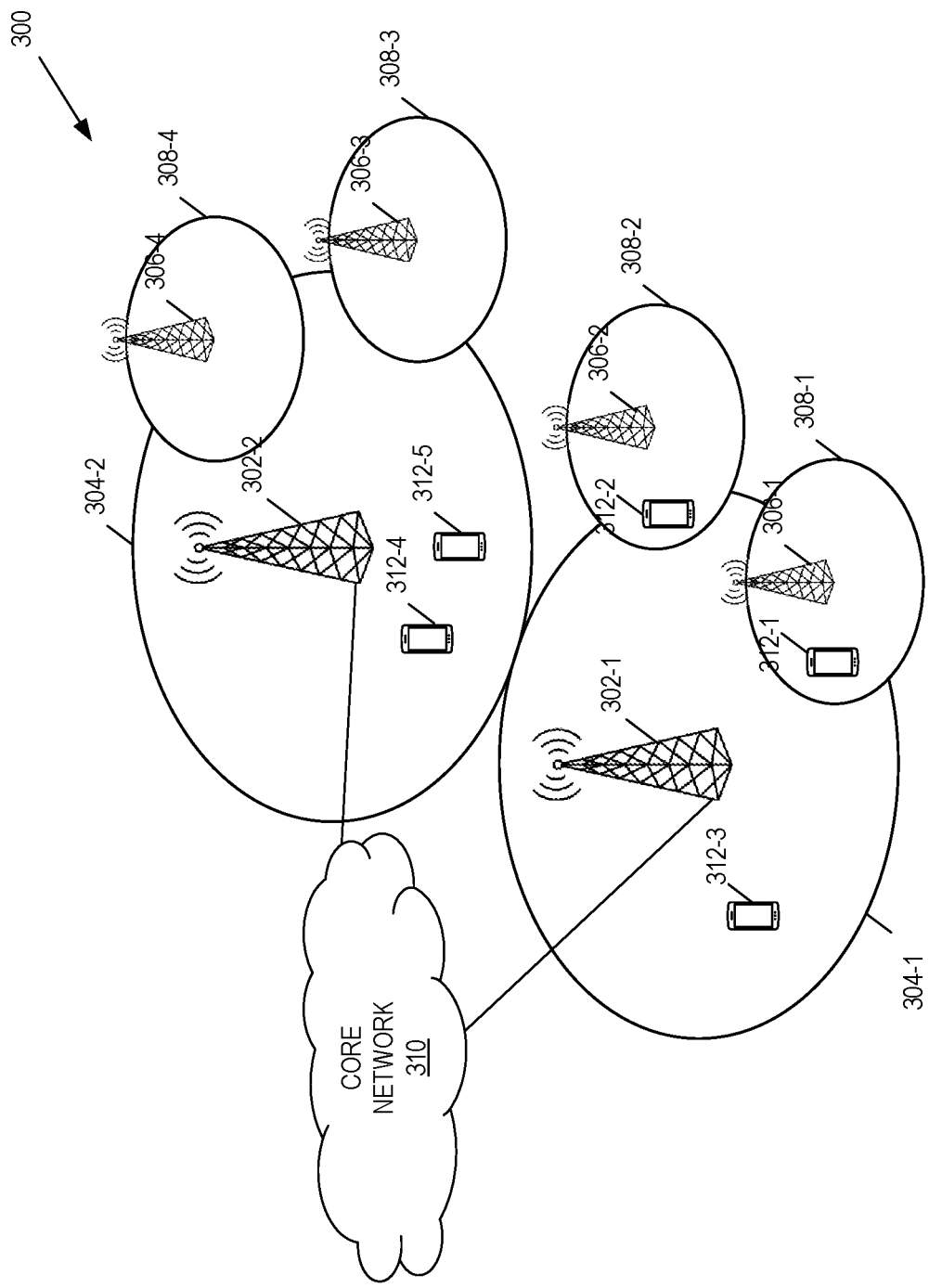
FIG. 3 illustrates one example of a cellular communications network in which embodiments of the present disclosure may be implemented.

In this regard, FIG. 3 illustrates one example of a cellular communications system 300 in which embodiments of the present disclosure may be applied. In the embodiments described herein, the cellular communications system 300 is either a 5G System (5GS) including a NR RAN, which is also sometimes referred to as a Next Generation (NG) RAN (NG-RAN), or an LTE system including an LTE RAN. In this example, the RAN of the cellular communications system 300 includes base stations 302-1 and 302-2, which in 5G NR are referred to as gNBs and in LTE are referred to as eNBs, controlling corresponding (macro) cells 304-1 and 304-2. The base stations 302-1 and 302-2 are generally referred to herein collectively as base stations 302 and individually as base station 302. Likewise, the (macro) cells 304-1 and 304-2 are generally referred to herein collectively as (macro) cells 304 and individually as (macro) cell 304. The RAN of the cellular communications system 300 may also include a number of low power nodes 306-1 through 306-4 controlling corresponding small cells 308-1 through 308-4. The low power nodes 306-1 through 306-4 can be small base stations (such as pico or femto base stations) or Remote Radio Heads (RRHs), or the like. Notably, while not illustrated, one or more of the small cells 308-1 through 308-4 may alternatively be provided by the base stations 302. The low power nodes 306-1 through 306-4 are generally referred to herein collectively as low power nodes 306 and individually as low power node 306. Likewise, the small cells 308-1 through 308-4 are generally referred to herein collectively as small cells 308 and individually as small cell 308. The base stations 302 (and optionally the low power nodes 306) are connected to a core network 310.

The base stations 302 and the low power nodes 306 provide service to wireless devices 312-1 through 312-5 in the corresponding cells 304 and 308. The wireless devices 312-1 through 312-5 are generally referred to herein collectively as wireless devices 312 and individually as wireless device 312. The wireless devices 312 are also referred to herein as UEs 312.

Figure 4:
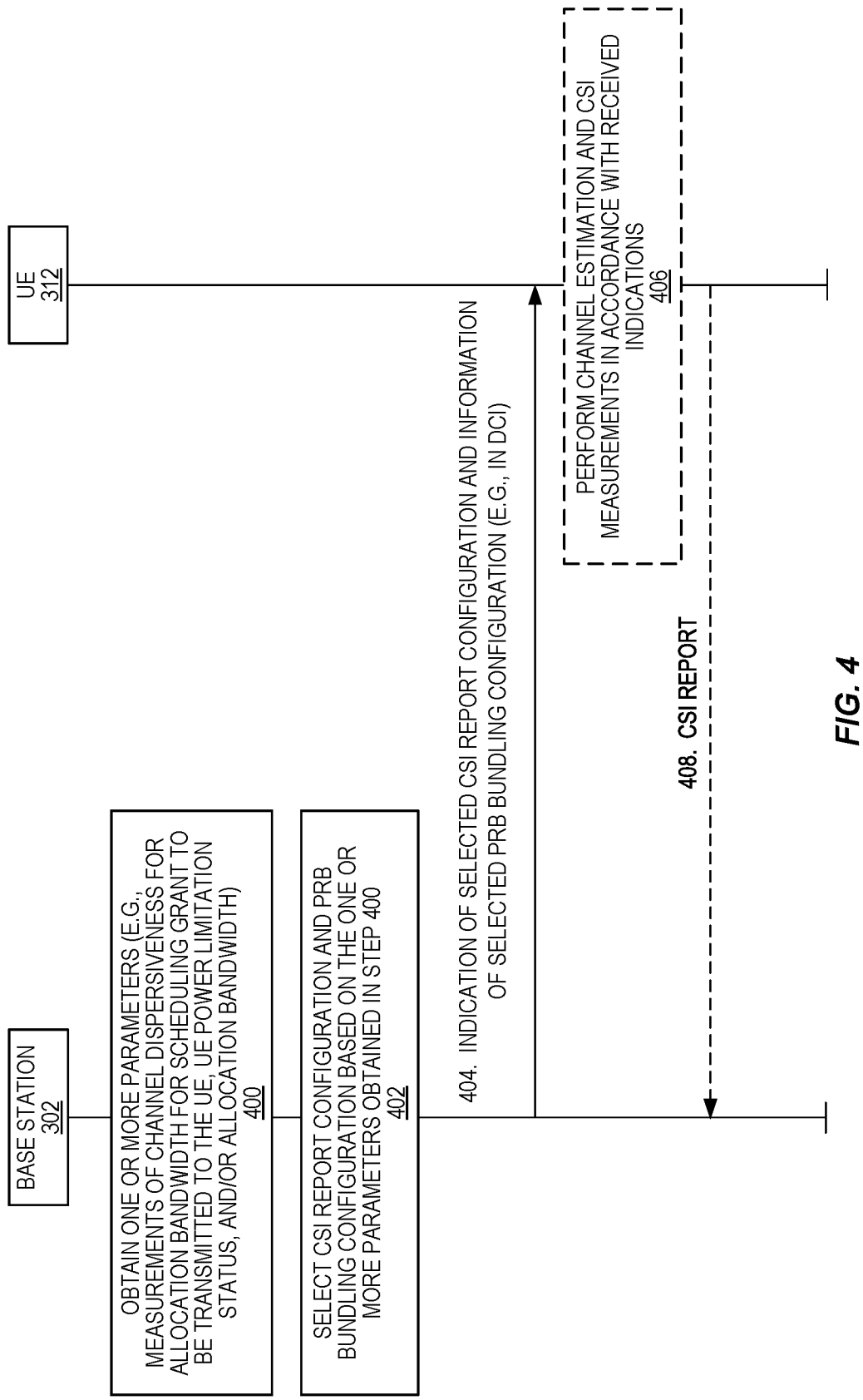
FIG. 4 illustrates the operation of a base station and a User Equipment (UE) in accordance with some embodiments of the present disclosure.

Now, the discussion turns to a description of some embodiments of the present disclosure. In this regard, FIG. 4 illustrates the operation of a base station 302 and a UE 312 in accordance with some embodiments of the present disclosure. As illustrated, the base station 302 (e.g., an eNB or gNB) obtains (e.g., computes) one or more parameters (step 400). As discussed below in detail, the one or more parameters include:

one or more measurements of channel dispersiveness for the wireless channel between the base station 302 and the UE 312, an UL power-limited status of the UE 312 (e.g., an indication of whether or not the UE 312 is UL power-limited), and/or an allocation bandwidth for the UE 312 (e.g., a corresponding allocation bandwidth for a DL transmission scheduled for the UE 312).

In some embodiments, the one or more measurements of the channel dispersiveness of the wireless channel between the base station 302 and the UE 312 include a measurement(s) of long-term channel dispersiveness of the wireless channel between the base station 302 and the UE 312, a measurement(s) of an instantaneous channel dispersiveness of the wireless channel between the base station 302 and the UE 312 for an allocation bandwidth for a scheduling grant to be transmitted to the UE 312, or both the measurement(s) of the long-term channel dispersiveness of the wireless channel between the base station 302 and the UE 312 and the measurement(s) of the instantaneous channel dispersiveness of the wireless channel between the base station 302 and the UE 312 for the allocation bandwidth for the scheduling grant to be transmitted to the UE 312.

While a more detailed description is provided below, some examples of how the base station 312 obtains (e.g., computes) the measurements of the instantaneous and long-term channel dispersiveness are as follows. As one example, the base station 312 obtains (e.g., computes) a Root Mean Squared (RMS) value of the subband Precoding Matrix Indications (PMIs) or subband Channel Quality Information (CQI) within the allocation bandwidth for the scheduling grant to be transmitted to the UE 312. This RMS value is a measurement of the instantaneous channel dispersiveness.

As one example, in order to compute the measurements of the long-term channel dispersiveness, the base station 312 obtains (e.g., computes) a set of RMS values, where this set of RMS values includes:

multiple RMS values of DL subband PMI feedback i2 for the subbands over time within the allocation bandwidth for the scheduling grant to be transmitted to the UE 312;

multiple RMS values of DL subband CQI for the subbands over time within the allocation bandwidth for the scheduling grant to be transmitted to the UE 312; or multiple RMS values of measurements made on UL Sounding Reference Signal (SRS), Demodulation Reference Signal (DMRS), and beams received from the UE 312 for the subbands over time within the allocation bandwidth for the scheduling grant to be transmitted to the UE 312.

The base station 312 applies filtering to the set of RMS measurements to thereby provide the measurements of the long-term channel dispersiveness.

The base station 312 selects a CSI report configuration and PRB bundling configuration for the UE 312 based on the one or more parameters obtained in step 400 (step 402). While a more detailed description is provided below, in some embodiments, in order to select the CSI reporting configuration, the network node selects wideband CSI reporting if the long-term channel dispersiveness is smaller than a threshold or if the UE is UL power-limited (e.g., when total transmit power is reached at the UE). Note that, in some embodiments, the network node uses UE reported power headroom to determine if the UE is UL power-limited or not. Otherwise, the network node selects subband CSI reporting.

In some embodiments, in order to select the CSI reporting configuration, the network node is configured to select subband CSI reporting if a measurement of the long-term channel dispersiveness is not available within a predefined or preconfigured amount of time or if the UE is UL power-limited. This may be beneficial in implementations in which subband CSI might not be available within a certain period.

In some embodiments, in order to select the PRB bundling configuration, when the size of the allocation bandwidth is larger than a threshold, the network node selects wideband PRB bundling if channel dispersiveness is smaller than a threshold or if a wideband CSI report was recently received recently (e.g., received within a predefined or preconfigured amount of time); otherwise, the network node selects subband PRB bundling.

In some embodiments, in order to select the PRB bundling configuration, when the size of the allocation bandwidth is smaller than a threshold, the network node selects (and applies) wideband PRB bundling.

In some embodiments, in order to select the PRB bundling configuration, when the size of the allocation bandwidth is smaller than a threshold, the network node selects (and applies) wideband PRB bundling if the measurement of the instantaneous dispersiveness is zero and, otherwise, selects (and applies) subband PRB bundling.

The base station 302 sends, to the UE 312, information that indicates the selected CSI report configuration and information that indicates the selected PRB bundling configuration (step 404). In some embodiments, this information is included in DL Control Information (DCI) transmitted to the UE 312, e.g., for the scheduling grant.

At the UE 312, the UE 312 optionally performs channel estimation and CSI measurements in accordance with the information received in step 404 (step 406) and optionally sends a corresponding CSI report to the base station 302 (step 408).

Embodiments of the present disclosure improve both UL and DL performance by adaptively selecting the best PRB bundling and CSI reporting configuration. A good trade-off is reached between UL and DL, beamforming and channel estimation, and hence overall system performance is improved adaptively.

More specifically, first, since wideband CSI reporting is applied when UL power limitation occurs or when the channel is less dispersive, fewer UL resources will be needed for CSI reporting (as compared to if subband CSI reporting were configured), which results in an improved UL performance. Second, DL channel estimation is improved when wideband bundling is applied. Beamforming performance is improved using subband bundling.

Now a more detailed description is provided for some of the steps of FIG. 4.

Obtaining Measurement(s) of Channel Dispersiveness (as Part of Step 400)

In some embodiments, the base station 302 obtains the measurement(s) of long-term channel dispersiveness using DL subband PMI report(s) received from the UE 312. More specifically, in some embodiments, the base station 302 obtains the measurement(s) of the long-term channel dispersiveness using the RMS of the subband PMIs. In this regard, the subband PMI co-phasing part is used to measure the dispersiveness of the channel. For each subband PMI, i2 represents a co-phasing index, and i2 can be one of the set {0, 1, 2, 3}. A measurement of the long-term channel dispersiveness of the channel can be computed as follows:

1. First, an average co-phasing value (averagePMI_i2) is computed as:

$$averagePMI\_i2 = sum(subbandPMI\_i2(n))/totalSubbandFreq$$

where subbandPMI_i2(n) is the list of subband PMI i2 values for the subbands in the total configured bandwidth, totalSubbandFreq is the number of subbands in the total configured bandwidth, and n is the subband index.

2. Second, the RMS (RMS_subband_PMI_i2) of the subband PMI is computed as:

$$RMS\_subband\_PMI\_i2 = sqrt\{sum[subbandPMI\_i2(n) - averagePMI\_i2)^2]\}$$

The RMS (RMS_subband_PMI_i2) of the subband PMI across the full configured bandwidth can be seen as a measurement of instantaneous channel dispersiveness across the full configured bandwidth.

Figure 5:
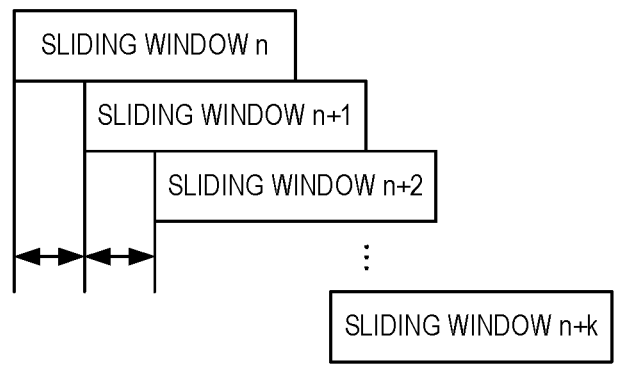
FIG. 5 illustrates averaging using a sliding window in accordance with some embodiments of the present disclosure.

3. The subband PMI RMS (RMS_subband_PMI_i2) can be averaged over time using a sliding window as shown in FIG. 5. The averaged subband PMI RMS (RMS_subband_PMI_i2_averaged) can thus be computed as:

$$RMS\_subband\_PMI\_i2\_averaged = sum(RMS\_subband\_PMI\_i2(m))/M$$

where RMS_subband_PMI_i2 (m) is a set of the recent RMS_subband_PMI_i2 values in the sliding window (e.g., in sliding window n) and M is the number of RMS_subband_PMI_i2 values within the sliding window (e.g., within the sliding window n).

If RMS_subband_PMI_i2_averaged is greater than a threshold (e.g., a predefined or preconfigured threshold), then the base station 302 determines that the channel is highly dispersive, i.e., high delay spread. In some embodiments, the threshold can be determined offline (e.g., via simulations) to get the maximum throughput.

In some other embodiments, the base station 302 obtains the measurement(s) of long-term channel dispersiveness using correlation of the subband PMIs. More specifically, with i2 and i1, full PMI is obtained for each subband. After the full PMI for each subband is obtained, variation of subband PMIs can be estimated. As one example, the variation of the subband PMIs can be estimated based on the chord distance variation between subband PMIs. For instance, the chord distance can be given by:

$$\delta_{d_{FS}(PMI_i, PMI_j)} = \frac{1}{TotalSubbandFreq} \Sigma_{i,j} d_{FS}(PMI_i, PMI_j)$$

where $$d_{FS}(PMI_i, PMI_j) = \arccos(|\det(PMI_i^H PMI_j)|)$$

and $PMI_i$ is the PMI for the ith subband and det(■) is the determination of matrix (■). If $$\delta_{d_{FS}(PMI_i, PMI_j)} > threshold$$

(where "threshold" may be a predefined or preconfigured threshold), subband PMI feedback and small precoding granularity can be used (i.e., the base station 302 can select a CSI report configuration having subband PMI). Otherwise, wider precoding granularity is used (e.g., wideband PMI, which means one bundle for the whole bandwidth). In regard to the threshold, in some embodiments, assume throughput is given by $$T = f\left(\delta_{d_{FS(PMI_i, PMI_j)}}, \text{precoding granularity}, SNR, MCS\right).$$

In order to optimize performance, one way to determine the threshold is to run simulation results to get one table between $$\delta_{d_{FS(PMI_i, PMI_j)}}$$

and precoding granularity, with which maximum throughput can be achieved. Based on this table, precoding granularity change and subband/wideband CSI report switch cam be performed.

Note that the examples of how measurements of channel dispersiveness can be computed above are only examples. In particular, measurements other than subband PMI can be used. Some other examples of measurements that can be used to estimate long term channel dispersiveness of the channel in the same way are DL subband CQI measurement and UL measurements such as, e.g., SRS, DMRS, and/or beam measurements.

In some embodiments, a timer for subband PMI subband reporting is used to periodically trigger subband PMI reporting unless the UE is UL power-limited. In some embodiments, this timer is implemented at the base station 302 such that the base station 302 will periodically trigger subband PMI reporting by the UE 312 even if wideband PMI reporting would have otherwise been configured in order to ensure that the base station 302 has the subband PMI values for computing the measurements of the long-term channel dispersiveness of the channel. More specifically, in some embodiments, a subband PMI reporting timer is introduced to request subband PMI report periodically unless the UE is UL power-limited. This is to make sure the dispersiveness is checked periodically in case wideband CSI reporting is requested all the time and not enough samples for subband PMI to measure dispersiveness. This situation is possible in case of bursty traffic.

Figure 6:
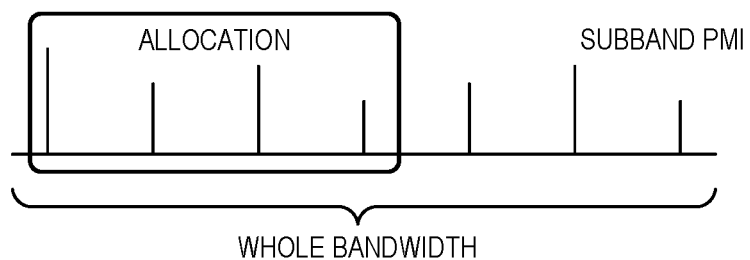
FIG. 6 illustrates subband Precoding Matrix Indicator (PMI) Root Mean Squared (RMS) computation within an allocation bandwidth in accordance with some embodiments of the present disclosure.

In some embodiments, the base station 302 additionally or alternatively obtains measurements of the instantaneous channel dispersiveness of the channel within the allocation bandwidth using subband PMI RMS. More specifically, after the scheduler and link adaptation function of the base station 302 determines the allocation bandwidth (also referred to herein as the allocation size), i.e., the number of PRBs, the subband PMI RMS within the allocation can be calculated using the same approach as described above. This RMS will indicate instantaneous dispersiveness within the allocation as shown in FIG. 6. This process is as follows:

1. First, average co-phasing value (averagePMI_i2) within the allocation is computed as:

averagePMI_I2=sum(subbandPMI_I2(n))/Allocation-SubbandFreq where subbandPMI_i2(n) is the list of subband PMI i2 values for the subbands in the allocation bandwidth, AllocationSubbandFreq is the number of subbands in the allocation bandwidth, and n is the subband index.

2. Second, the RMS (RMS_subband_PMI_i2) of the subband PMI is computed as:

RMS_subband_PMI_I2=sqrt{sum[(subbandPMI_I2(n)−averagePMI_I2)^2]}, where n is the subband index within the allocation.

Selecting CSI Report Configuration and PRB Bundling Configuration (Step 402)

Figure 7:
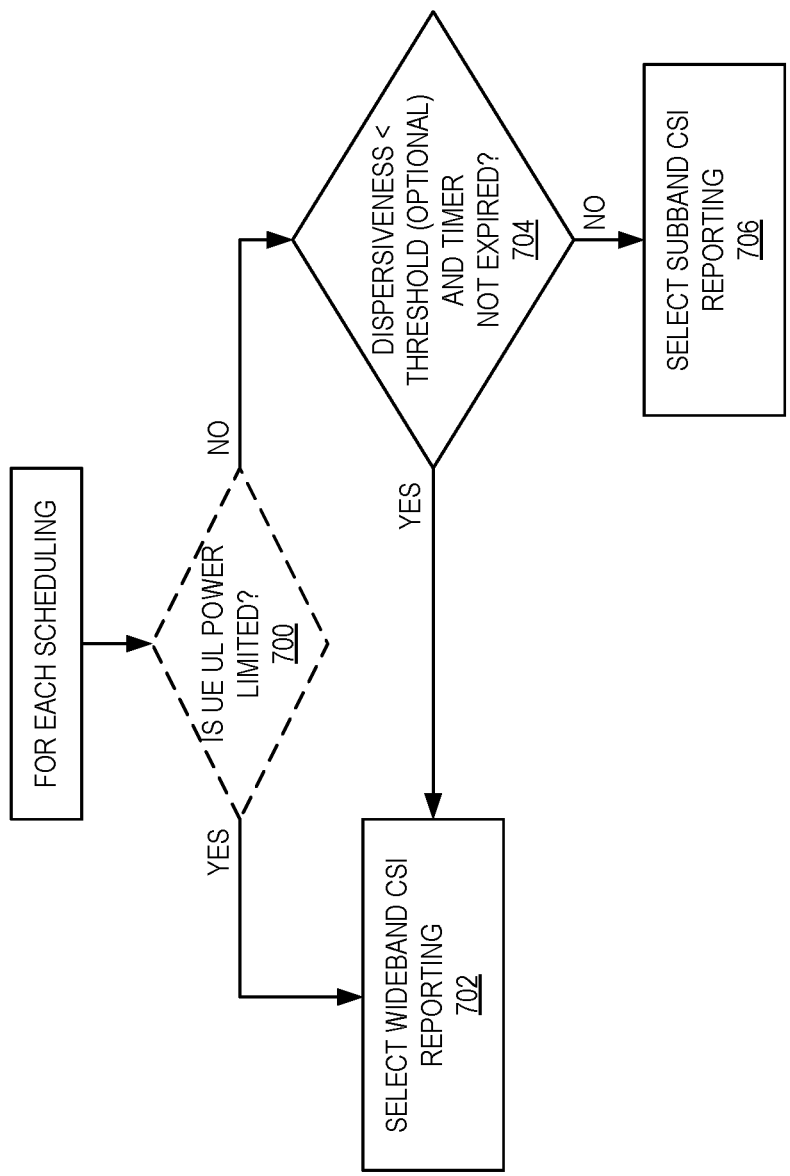
FIG. 7 is a flow chart that illustrates a process performed by a base station to adaptively select a Channel State Information (CSI) report configuration based on a measurement of long-term channel dispersiveness together with information that indicates whether a respective UE is uplink (UL) power-limited and a subband reporting timer in accordance with some embodiments of the present disclosure.

The base station 302 adaptively selects the CSI report configuration (i.e., the CSI reporting settings) based on the parameters obtained in step 400. In this regard, FIG. 7 is a flow chart that illustrates a process performed by the base station 302 to adaptively select the CSI report configuration based on the obtained parameters in accordance with one example embodiment of the present disclosure. Note that optional steps are represented with dashed lines or otherwise denoted in the figure. In this example, the base station 302 adaptively selects the CSI report configuration based on the UL power-limited status of the UE 312 (optional), the measurement(s) of channel dispersiveness of the wireless channel (optional), and the subband reporting timer. As illustrated, for each scheduling grant, the base station 302 optionally determines whether the respective UE 312 is UL power-limited (step 700). If the UE 312 is UL power-limited (step 700, YES), the base station 302 selects wideband CSI reporting for the CSI report configuration (step 702). Thus, if the UE 312 is UL power-limited, wideband CSI reporting is configured. This is to make sure that CSI overhead for UL is minimized to maximize the UL throughput.

If the UE is not UL power-limited (step 700, NO), the base station 302 determines whether the measurement of the channel dispersiveness (e.g., the measurement of long-term channel dispersiveness) is less than a predefined or preconfigured threshold (optional) and the subband PMI reporting timer is expired (step 704). If so (step 704, YES), the base station 302 selects wideband CSI reporting (step 702). Otherwise (step 704, NO), the base station 302 selects subband CSI reporting (step 706).

Figure 8:
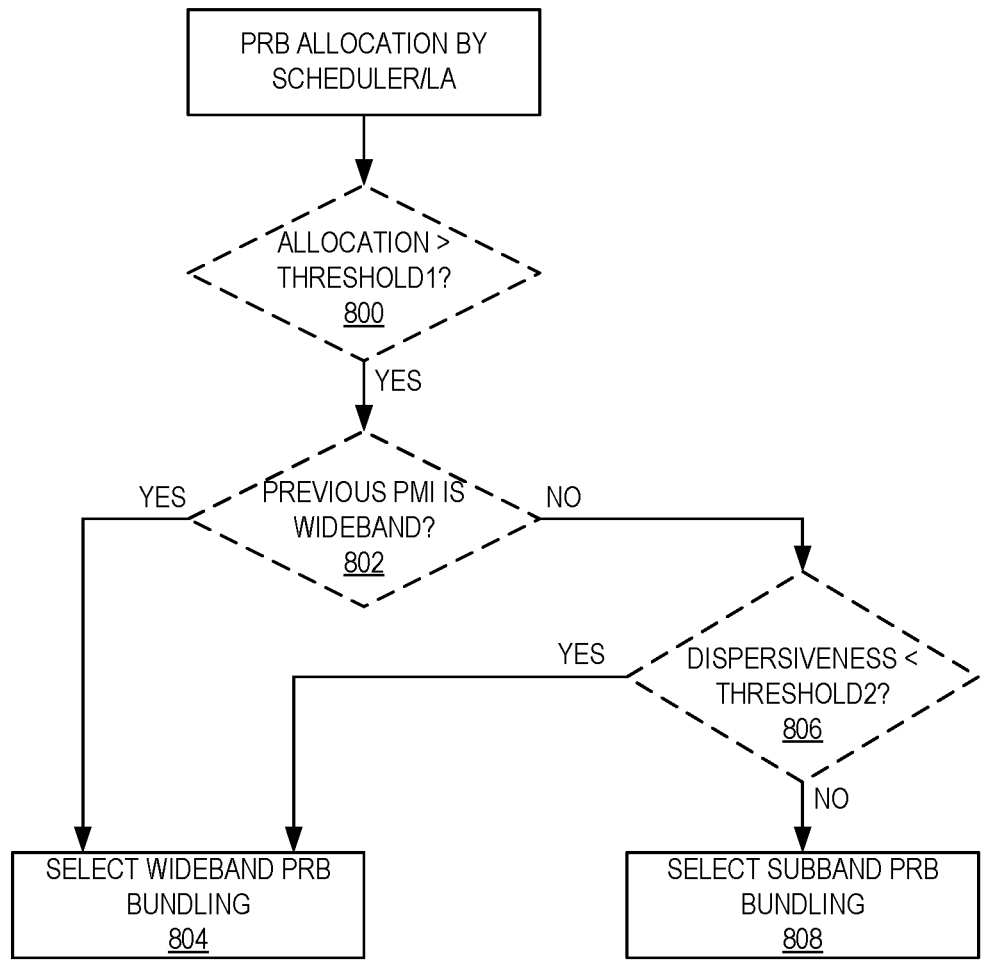
FIG. 8 is a flow chart that illustrates a process performed by a base station to select a Physical Resource Block (PRB) bundling configuration when an allocation bandwidth for a scheduling grant to a UE is large in accordance with some embodiments of the present disclosure.

In some embodiments, the base station 302 also adaptively selects the PRB bundling configuration. In this regard, FIG. 8 is a flow chart that illustrates a process performed by the base station 302 to select the PRB bundling configuration in accordance with some embodiments of the present disclosure. In this example, the PRB bundling configuration is selected based on the allocation bandwidth, whether a measurement of channel dispersiveness is available (e.g., as determined, in this example, by determining whether the previous PMI report is a wideband report or a subband report), and/or channel dispersiveness. Again, optional steps are indicated by dashed lines.

As illustrated, for each scheduling decision, the base station 302 determines whether the allocation bandwidth is greater than a threshold (THRESHOLD1), which may be predefined or preconfigured (step 800). If not (i.e., if the allocation bandwidth is small), the base station 302 may perform the process of either FIG. 9 or FIG. 10. However, if the allocation bandwidth is greater than THRESHOLD1 (i.e., the allocation bandwidth is large), the base station 302 determines whether a measurement of (e.g., long-term) channel dispersiveness is available by, in this example, determining whether the previous PMI report is a wideband PMI report (step 802). If so (step 802, YES), a measurement of (e.g., long-term) channel dispersiveness is not available, and the base station 302 selects wideband PRB bundling (step 804). Otherwise, if the previous PMI report is a subband PMI report (i.e., if a measurement of (e.g., long-term) channel dispersiveness is available) (step 802, NO), the base station 302 determines whether the measurement of (e.g., long-term) channel dispersiveness of the channel is less than a threshold (THRESHOLD2), which may be predefined or preconfigured (step 806). If so (step 806, YES), the base station 302 selects wideband PRB bundling (step 804). Note that, in this case, the wideband PMI (e.g., wideband i2 value) will be one of the subband PMI values (e.g., one of the subband i2 values) such as, e.g., the dominant subband PMI value from the subband PMI report (i.e., the subband PMI value that occurs the most in the subband PMI report), as described below with respect to the process of FIG. 11. Otherwise, if the measurement of (e.g., long-term) channel dispersiveness is not less than THRESHOLD2 (step 806, NO), the base station 302 selects subband PRB bundling (step 808).

Figure 9:
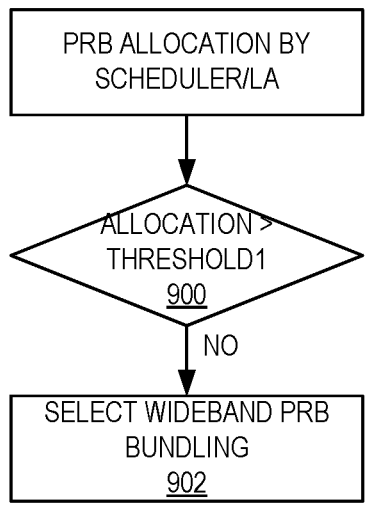
FIG. 9 illustrates one example of a process performed by a base station to select a PRB bundling configuration when a bandwidth allocation for a scheduling grant to a UE is small in accordance with some embodiments of the present disclosure.

FIG. 9 illustrates one example of a process performed by the base station 302 to select the PRB bundling configuration when the bandwidth allocation for the scheduling grant to the UE 312 is small (e.g., less than a predefined or preconfigured threshold) in accordance with some embodiments of the present disclosure. As illustrated, the base station 302 determines whether the allocation bandwidth is greater than THRESHOLD1 (step 900). Note that in some embodiments, step 900 corresponds to step 800 in FIG. 8. If the allocation bandwidth is not greater than THRESHOLD1, the base station selects wideband PRB bundling (step 902). Note that, if the previous PMI report is a subband PMI report, the wideband PMI (e.g., wideband i2 value) will be one of the subband PMI values (e.g., one of the subband i2 values) such as, e.g., the dominant subband PMI value from the subband PMI report (i.e., the subband PMI value that occurs the most in the subband PMI report), as described below with respect to the process of FIG. 11.

Figure 10:
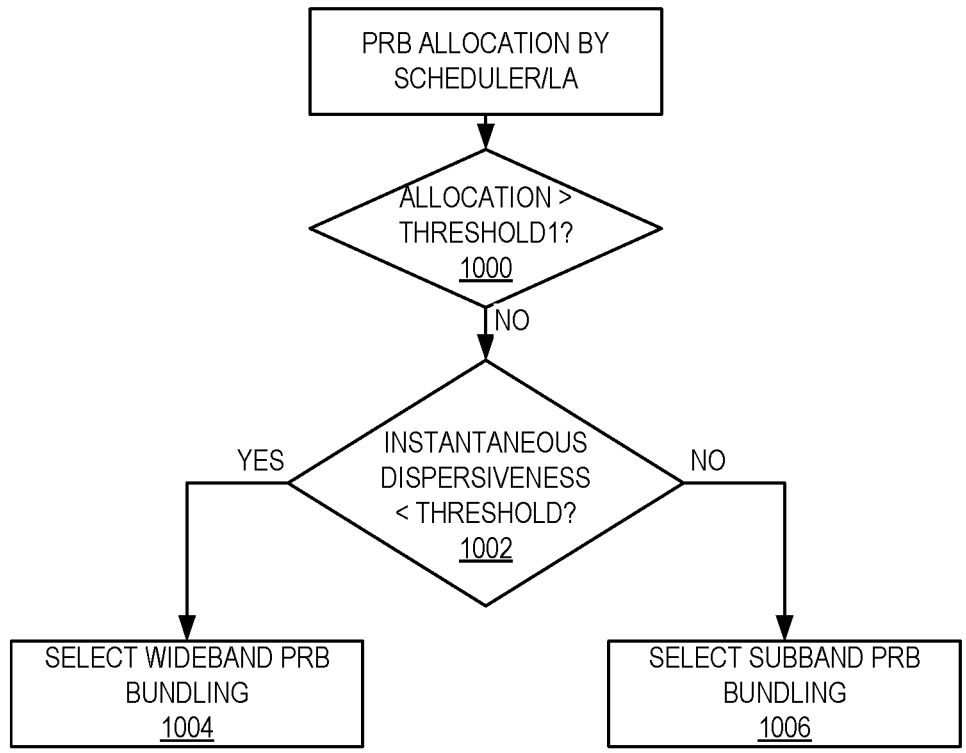
FIG. 10 illustrates another example of a process performed by a base station to select a PRB bundling configuration when a bandwidth allocation for a scheduling grant to a UE is small in accordance with some embodiments of the present disclosure.

FIG. 10 illustrates one example of a process performed by the base station 302 to select the PRB bundling configuration when the bandwidth allocation for the scheduling grant to the UE 312 is small (e.g., less than a predefined or preconfigured threshold) in accordance with some other embodiments of the present disclosure. As illustrated, the base station 302 determines whether the allocation bandwidth is greater than THRESHOLD1 (step 1000). Note that in some embodiments, step 1000 corresponds to step 800 in FIG. 8. If the allocation bandwidth is not greater than THRESHOLD1, the base station 302 determines whether the measurement of instantaneous channel dispersiveness over the allocation bandwidth is less than a threshold, which may be predefined or preconfigured (step 1002). If so (step 1002, YES), the base station 302 selects wideband PRB bundling (step 1004). Note that, if the previous PMI report is a subband PMI report, the wideband PMI (e.g., wideband i2 value) will be one of the subband PMI values (e.g., one of the subband i2 values) such as, e.g., the dominant subband PMI value from the subband PMI report (i.e., the subband PMI value that occurs the most in the subband PMI report), as described below with respect to the process of FIG. 11. Otherwise, if the measurement of instantaneous channel dispersiveness over the allocation bandwidth is not less than the threshold (step 1002, NO), the base station 302 selects subband PRB bundling (step 1006).

Figure 11:
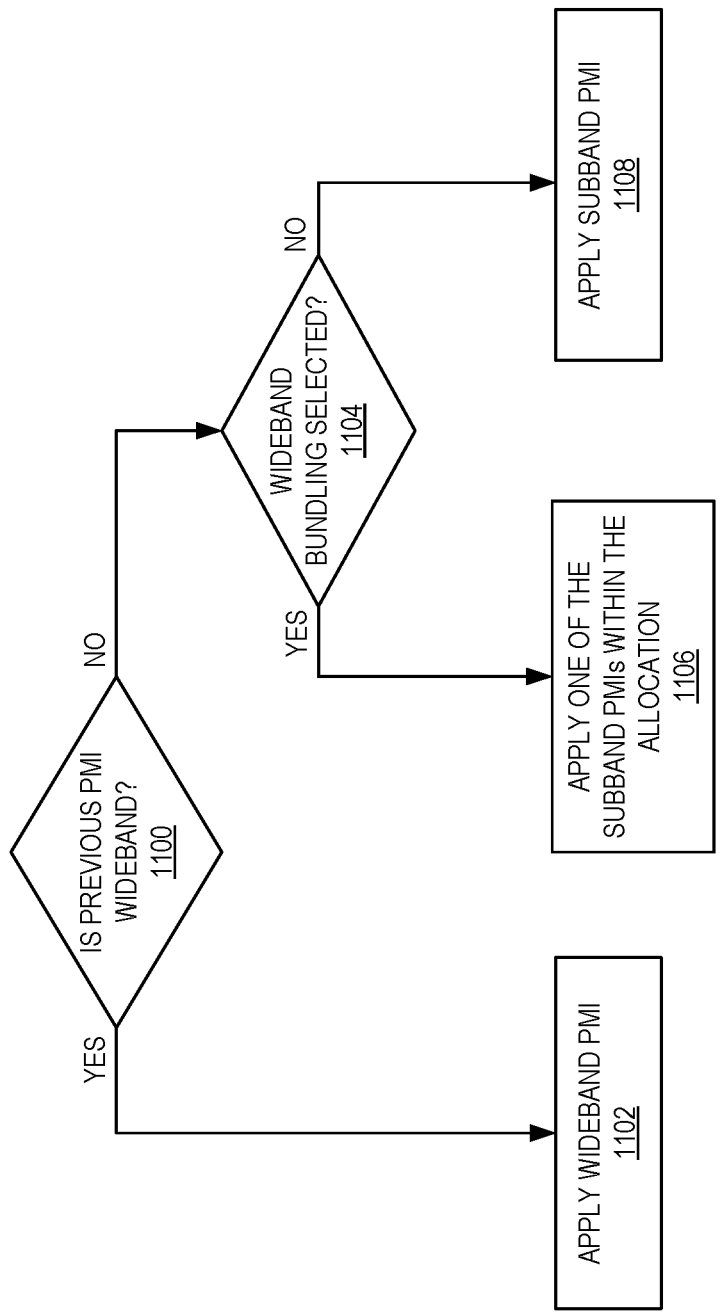
FIG. 11 illustrates a process performed by a base station to select a precoding vector to be applied in accordance with some embodiments of the present disclosure.

As mentioned above, the when selecting wideband PRB bundling, the previous PMI report may be either a wideband PMI report or a subband PMI report. If the previous PMI report is a subband PMI report, the base station 302 selects one of the subband PMI values (e.g., one of the subband i2 values) such as, e.g., the dominant subband PMI value from the subband PMI report (i.e., the subband PMI value that occurs the most in the subband PMI report) as the wideband PMI (e.g., wideband i2 value). In this regard, FIG. 11 illustrates process performed by the base station 302 to select the PMI to be applied in accordance with some embodiments of the present disclosure. In this regard, FIG. 11 is a flow chart that illustrates a process performed by the base station 302 in accordance with some embodiments of the present disclosure. As illustrated, the base station 302 determines whether the previous PMI report is a wideband PMI report (step 1100). If so (step 1100, YES), the base station 302 applies the wideband PMI when transmitting the scheduled transmission to the UE 312 (step 1102). Otherwise, if the previous PMI report is a subband PMI report (step 1100, NO), the base station 302 determines whether wideband PRB bundling was selected (step 1104). If so (step 1104, YES), the base station 302 selects one of the subband PMI values (e.g., one of the subband i2 values) such as, e.g., the dominant subband PMI value from the subband PMI report (i.e., the subband PMI value that occurs the most in the subband PMI report, i.e., the subband PMI value with the largest reporting bandwidth) as the wideband PMI (e.g., wideband i2 value) to be applied when transmitting the scheduled transmission to the UE 312 (step 1106). Otherwise (step 1104, NO), the base station 302 applies the subband PMI values from the subband PMI report when transmitting the scheduled transmission to the UE 312 (step 1108).

Figure 12:
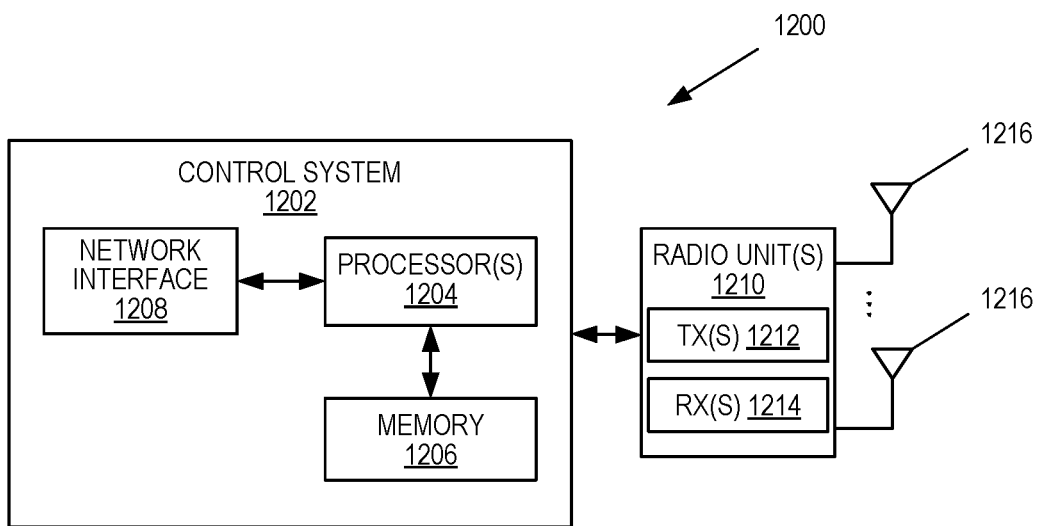
FIG. 12 is a schematic block diagram of a radio access node according to some embodiments of the present disclosure.

FIG. 12 is a schematic block diagram of a radio access node 1200 according to some embodiments of the present disclosure. The radio access node 1200 may be, for example, a base station 302 or 306. As illustrated, the radio access node 1200 includes a control system 1202 that includes one or more processors 1204 (e.g., Central Processing Units (CPUs), Application Specific Integrated Circuits (ASICs), Field Programmable Gate Arrays (FPGAs), and/or the like), memory 1206, and a network interface 1208. The one or more processors 1204 are also referred to herein as processing circuitry. In addition, the radio access node 1200 includes one or more radio units 1210 that each includes one or more transmitters 1212 and one or more receivers 1214 coupled to one or more antennas 1216. The radio units 1210 may be referred to or be part of radio interface circuitry. In some embodiments, the radio unit(s) 1210 is external to the control system 1202 and connected to the control system 1202 via, e.g., a wired connection (e.g., an optical cable). However, in some other embodiments, the radio unit(s) 1210 and potentially the antenna(s) 1216 are integrated together with the control system 1202. The one or more processors 1204 operate to provide one or more functions of a radio access node 1200 as described herein (e.g., one or more functions of the base station 302, gNB, or eNB described herein, e.g., with respect to FIGS. 4, 5, 6, 7, 8, 9, 10, and 11). In some embodiments, the function(s) are implemented in software that is stored, e.g., in the memory 1206 and executed by the one or more processors 1204.

Figure 13:
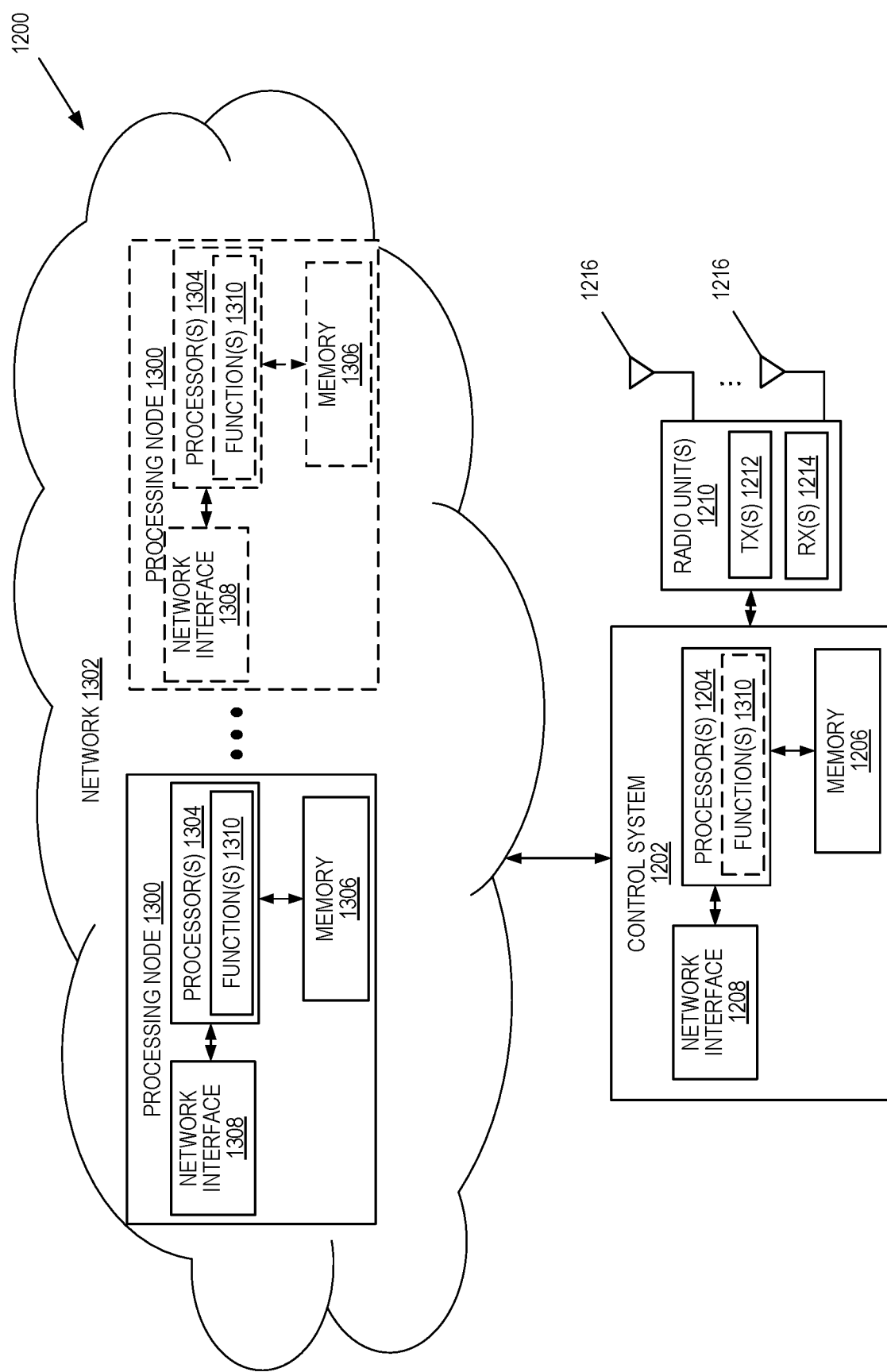
FIG. 13 is a schematic block diagram that illustrates a virtualized embodiment of the radio access node of FIG. 12 according to some embodiments of the present disclosure.

FIG. 13 is a schematic block diagram that illustrates a virtualized embodiment of the radio access node 1200 according to some embodiments of the present disclosure. This discussion is equally applicable to other types of network nodes. Further, other types of network nodes may have similar virtualized architectures.

As used herein, a "virtualized" radio access node is an implementation of the radio access node 1200 in which at least a portion of the functionality of the radio access node 1200 is implemented as a virtual component(s) (e.g., via a virtual machine(s) executing on a physical processing node(s) in a network(s)). As illustrated, in this example, the radio access node 1200 includes the control system 1202 that includes the one or more processors 1204 (e.g., CPUs, ASICs, FPGAs, and/or the like), the memory 1206, and the network interface 1208 and the one or more radio units 1210 that each includes the one or more transmitters 1212 and the one or more receivers 1214 coupled to the one or more antennas 1216, as described above. The control system 1202 is connected to the radio unit(s) 1210 via, for example, an optical cable or the like. The control system 1202 is connected to one or more processing nodes 1300 coupled to or included as part of a network(s) 1302 via the network interface 1208. Each processing node 1300 includes one or more processors 1304 (e.g., CPUs, ASICs, FPGAs, and/or the like), memory 1306, and a network interface 1308.

In this example, functions 1310 of the radio access node 1200 described herein (e.g., one or more functions of the base station 302, gNB, or eNB described herein, e.g., with respect to FIGS. 4, 5, 6, 7, 8, 9, 10, and 11) are implemented at the one or more processing nodes 1300 or distributed across the control system 1202 and the one or more processing nodes 1300 in any desired manner. In some particular embodiments, some or all of the functions 1310 of the radio access node 1200 described herein are implemented as virtual components executed by one or more virtual machines implemented in a virtual environment(s) hosted by the processing node(s) 1300. As will be appreciated by one of ordinary skill in the art, additional signaling or communication between the processing node(s) 1300 and the control system 1202 is used in order to carry out at least some of the desired functions 1310. Notably, in some embodiments, the control system 1202 may not be included, in which case the radio unit(s) 1210 communicates directly with the processing node(s) 1300 via an appropriate network interface(s).

In some embodiments, a computer program including instructions which, when executed by at least one processor, causes the at least one processor to carry out the functionality of radio access node 1200 (e.g., one or more functions of the base station 302, gNB, or eNB described herein, e.g., with respect to FIGS. 4, 5, 6, 7, 8, 9, 10, and 11) or a node (e.g., a processing node 1300) implementing one or more of the functions 1310 of the radio access node 1200 in a virtual environment according to any of the embodiments described herein is provided. In some embodiments, a carrier comprising the aforementioned computer program product is provided. The carrier is one of an electronic signal, an optical signal, a radio signal, or a computer readable storage medium (e.g., a non-transitory computer readable medium such as memory).

Figure 14:
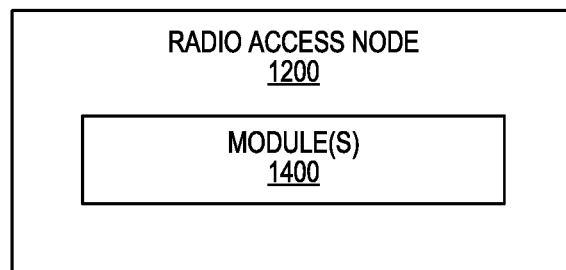
FIG. 14 is a schematic block diagram of the radio access node of FIG. 12 according to some other embodiments of the present disclosure.

FIG. 14 is a schematic block diagram of the radio access node 1200 according to some other embodiments of the present disclosure. The radio access node 1200 includes one or more modules 1400, each of which is implemented in software. The module(s) 1400 provide the functionality of the radio access node 1200 described herein (e.g., one or more functions of the base station 302, gNB, or eNB described herein, e.g., with respect to FIGS. 4, 5, 6, 7, 8, 9, 10, and 11). This discussion is equally applicable to the processing node 1300 of FIG. 13 where the modules 1400 may be implemented at one of the processing nodes 1300 or distributed across multiple processing nodes 1300 and/or distributed across the processing node(s) 1300 and the control system 1202. As an example, in one embodiment, the module(s) 1400 include a obtaining module operable to perform the functionality of the base station 302 described above with respect to step 400 of FIG. 4, a selecting module operable to perform the functionality of the base station 302 described above with respect to step 402 of FIG. 4, and a sending module operable to perform the functionality of the base station 302 described above with respect to step 404 of FIG. 4.

Figure 15:
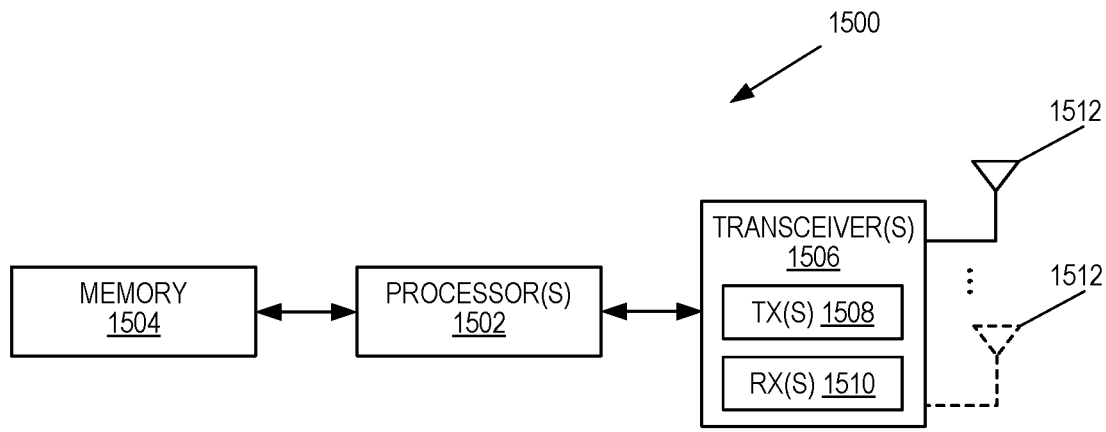
FIG. 15 is a schematic block diagram of a UE according to some embodiments of the present disclosure.

FIG. 15 is a schematic block diagram of a UE 1500 according to some embodiments of the present disclosure. As illustrated, the UE 1500 includes one or more processors 1502 (e.g., CPUs, ASICs, FPGAs, and/or the like), memory 1504, and one or more transceivers 1506 each including one or more transmitters 1508 and one or more receivers 1510 coupled to one or more antennas 1512. The transceiver(s) 1506 includes radio-front end circuitry connected to the antenna(s) 1512 that is configured to condition signals communicated between the antenna(s) 1512 and the processor(s) 1502, as will be appreciated by on of ordinary skill in the art. The processors 1502 are also referred to herein as processing circuitry. The transceivers 1506 are also referred to herein as radio circuitry. In some embodiments, the functionality of the UE 1500 described above (e.g., one or more functions of the UE 312 described herein, e.g., with respect to FIGS. 4, 5, 6, 7, 8, 9, 10, and 11) may be fully or partially implemented in software that is, e.g., stored in the memory 1504 and executed by the processor(s) 1502. Note that the UE 1500 may include additional components not illustrated in FIG. 15 such as, e.g., one or more user interface components (e.g., an input/output interface including a display, buttons, a touch screen, a microphone, a speaker(s), and/or the like and/or any other components for allowing input of information into the UE 1500 and/or allowing output of information from the UE 1500), a power supply (e.g., a battery and associated power circuitry), etc.

In some embodiments, a computer program including instructions which, when executed by at least one processor, causes the at least one processor to carry out the functionality of the UE 1500 according to any of the embodiments described herein (e.g., one or more functions of the UE 312 described herein, e.g., with respect to FIGS. 4, 5, 6, 7, 8, 9, 10, and 11) is provided. In some embodiments, a carrier comprising the aforementioned computer program product is provided. The carrier is one of an electronic signal, an optical signal, a radio signal, or a computer readable storage medium (e.g., a non-transitory computer readable medium such as memory).

Figure 16:
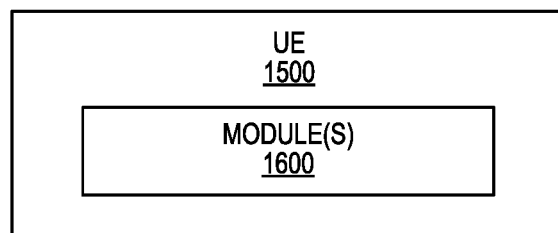
FIG. 16 is a schematic block diagram of the UE of FIG. 15 according to some other embodiments of the present disclosure.

FIG. 16 is a schematic block diagram of the UE 1500 according to some other embodiments of the present disclosure. The UE 1500 includes one or more modules 1600, each of which is implemented in software. The module(s) 1600 provide the functionality of the UE 1500 described herein (e.g., one or more functions of the UE 312 described herein, e.g., with respect to FIGS. 4, 5, 6, 7, 8, 9, 10, and 11).

Figure 17:
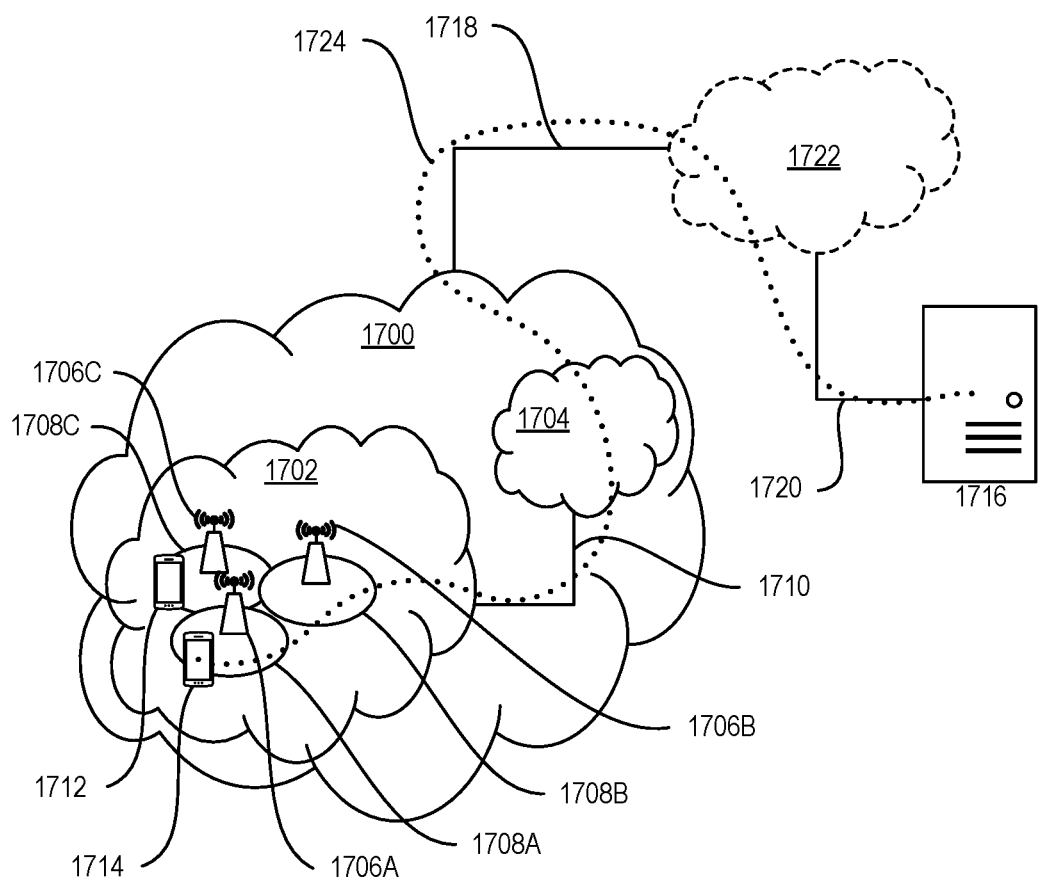
FIG. 17 illustrates a telecommunication network connected via an intermediate network to a host computer in accordance with some embodiments of the present disclosure.

With reference to FIG. 17, in accordance with an embodiment, a communication system includes a telecommunication network 1700, such as a 3GPP-type cellular network, which comprises an access network 1702, such as a RAN, and a core network 1704. The access network 1702 comprises a plurality of base stations 1706A, 1706B, 1706C, such as Node Bs, eNBs, gNBs, or other types of wireless Access Points (APs), each defining a corresponding coverage area 1708A, 1708B, 1708C. Each base station 1706A, 1706B, 1706C is connectable to the core network 1704 over a wired or wireless connection 1710. A first UE 1712 located in coverage area 1708C is configured to wirelessly connect to, or be paged by, the corresponding base station 1706C. A second UE 1714 in coverage area 1708A is wirelessly connectable to the corresponding base station 1706A. While a plurality of UEs 1712, 1714 are illustrated in this example, the disclosed embodiments are equally applicable to a situation where a sole UE is in the coverage area or where a sole UE is connecting to the corresponding base station 1706.

The telecommunication network 1700 is itself connected to a host computer 1716, which may be embodied in the hardware and/or software of a standalone server, a cloud-implemented server, a distributed server, or as processing resources in a server farm. The host computer 1716 may be under the ownership or control of a service provider, or may be operated by the service provider or on behalf of the service provider. Connections 1718 and 1720 between the telecommunication network 1700 and the host computer 1716 may extend directly from the core network 1704 to the host computer 1716 or may go via an optional intermediate network 1722. The intermediate network 1722 may be one of, or a combination of more than one of, a public, private, or hosted network; the intermediate network 1722, if any, may be a backbone network or the Internet; in particular, the intermediate network 1722 may comprise two or more sub-networks (not shown).

The communication system of FIG. 17 as a whole enables connectivity between the connected UEs 1712, 1714 and the host computer 1716. The connectivity may be described as an Over-the-Top (OTT) connection 1724. The host computer 1716 and the connected UEs 1712, 1714 are configured to communicate data and/or signaling via the OTT connection 1724, using the access network 1702, the core network 1704, any intermediate network 1722, and possible further infrastructure (not shown) as intermediaries. The OTT connection 1724 may be transparent in the sense that the participating communication devices through which the OTT connection 1724 passes are unaware of routing of uplink and downlink communications. For example, the base station 1706 may not or need not be informed about the past routing of an incoming downlink communication with data originating from the host computer 1716 to be forwarded (e.g., handed over) to a connected UE 1712. Similarly, the base station 1706 need not be aware of the future routing of an outgoing uplink communication originating from the UE 1712 towards the host computer 1716.

Example implementations, in accordance with an embodiment, of the UE, base station, and host computer discussed in the preceding paragraphs will now be described with reference to FIG. 18. In a communication system 1800, a host computer 1802 comprises hardware 1804 including a communication interface 1806 configured to set up and maintain a wired or wireless connection with an interface of a different communication device of the communication system 1800. The host computer 1802 further comprises processing circuitry 1808, which may have storage and/or processing capabilities. In particular, the processing circuitry 1808 may comprise one or more programmable processors, ASICs, FPGAs, or combinations of these (not shown) adapted to execute instructions. The host computer 1802 further comprises software 1810, which is stored in or accessible by the host computer 1802 and executable by the processing circuitry 1808. The software 1810 includes a host application 1812. The host application 1812 may be operable to provide a service to a remote user, such as a UE 1814 connecting via an OTT connection 1816 terminating at the UE 1814 and the host computer 1802. In providing the service to the remote user, the host application 1812 may provide user data which is transmitted using the OTT connection 1816.

The communication system 1800 further includes a base station 1818 provided in a telecommunication system and comprising hardware 1820 enabling it to communicate with the host computer 1802 and with the UE 1814. The hardware 1820 may include a communication interface 1822 for setting up and maintaining a wired or wireless connection with an interface of a different communication device of the communication system 1800, as well as a radio interface 1824 for setting up and maintaining at least a wireless connection 1826 with the UE 1814 located in a coverage area (not shown in FIG. 18) served by the base station 1818. The communication interface 1822 may be configured to facilitate a connection 1828 to the host computer 1802. The connection 1828 may be direct or it may pass through a core network (not shown in FIG. 18) of the telecommunication system and/or through one or more intermediate networks outside the telecommunication system. In the embodiment shown, the hardware 1820 of the base station 1818 further includes processing circuitry 1830, which may comprise one or more programmable processors, ASICs, FPGAs, or combinations of these (not shown) adapted to execute instructions. The base station 1818 further has software 1832 stored internally or accessible via an external connection.

The communication system 1800 further includes the UE 1814 already referred to. The UE's 1814 hardware 1834 may include a radio interface 1836 configured to set up and maintain a wireless connection 1826 with a base station serving a coverage area in which the UE 1814 is currently located. The hardware 1834 of the UE 1814 further includes processing circuitry 1838, which may comprise one or more programmable processors, ASICs, FPGAs, or combinations of these (not shown) adapted to execute instructions. The UE 1814 further comprises software 1840, which is stored in or accessible by the UE 1814 and executable by the processing circuitry 1838. The software 1840 includes a client application 1842. The client application 1842 may be operable to provide a service to a human or non-human user via the UE 1814, with the support of the host computer 1802. In the host computer 1802, the executing host application 1812 may communicate with the executing client application 1842 via the OTT connection 1816 terminating at the UE 1814 and the host computer 1802. In providing the service to the user, the client application 1842 may receive request data from the host application 1812 and provide user data in response to the request data. The OTT connection 1816 may transfer both the request data and the user data. The client application 1842 may interact with the user to generate the user data that it provides.

Figure 18:
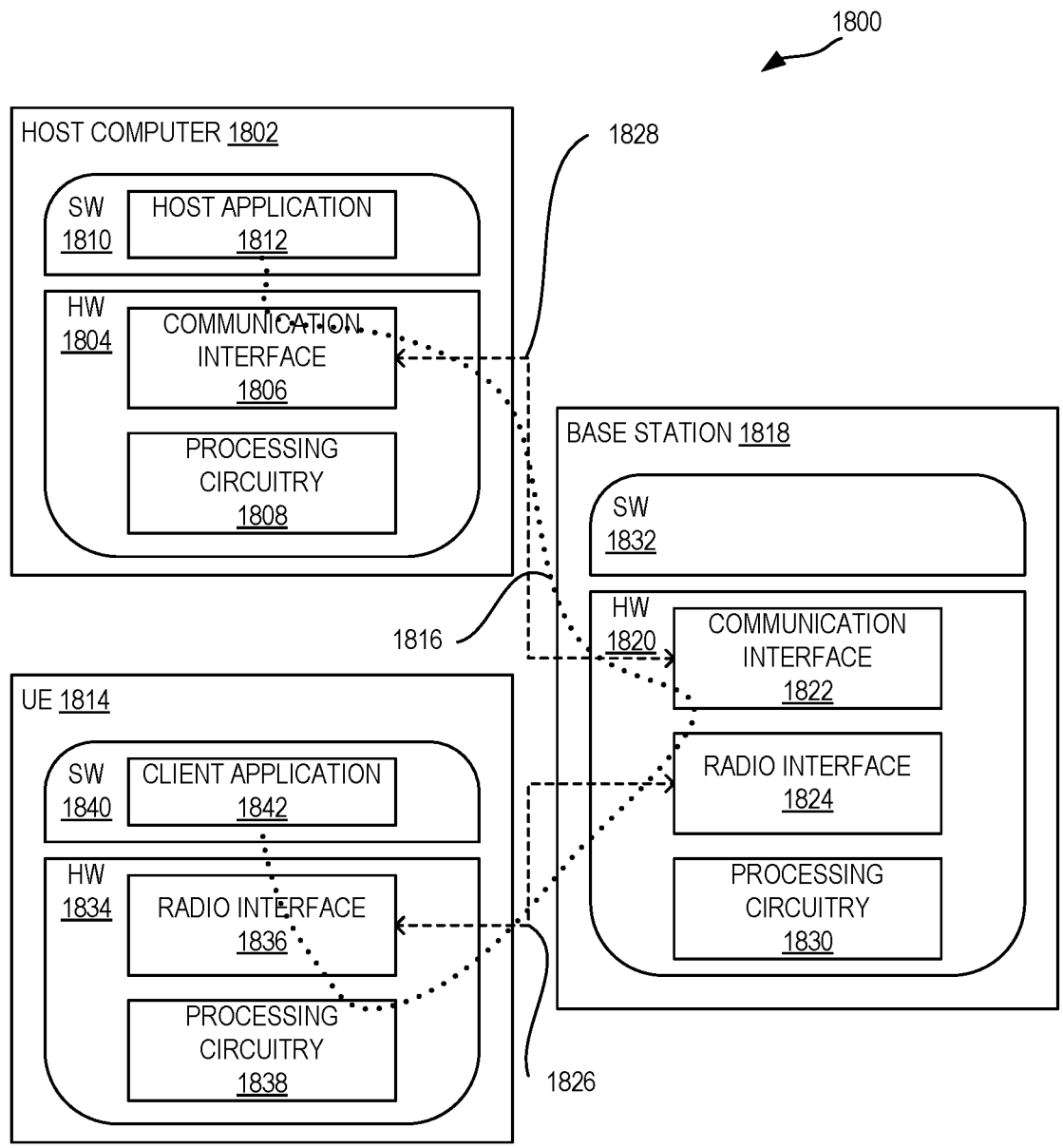
FIG. 18 is a generalized block diagram of a host computer communicating via a base station with a UE over a partially wireless connection in accordance with some embodiments of the present disclosure.

It is noted that the host computer 1802, the base station 1818, and the UE 1814 illustrated in FIG. 18 may be similar or identical to the host computer 1716, one of the base stations 1706A, 1706B, 1706C, and one of the UEs 1712, 1714 of FIG. 17, respectively. This is to say, the inner workings of these entities may be as shown in FIG. 18 and independently, the surrounding network topology may be that of FIG. 17.

In FIG. 18, the OTT connection 1816 has been drawn abstractly to illustrate the communication between the host computer 1802 and the UE 1814 via the base station 1818 without explicit reference to any intermediary devices and the precise routing of messages via these devices. The network infrastructure may determine the routing, which may be configured to hide from the UE 1814 or from the service provider operating the host computer 1802, or both. While the OTT connection 1816 is active, the network infrastructure may further take decisions by which it dynamically changes the routing (e.g., on the basis of load balancing consideration or reconfiguration of the network).

The wireless connection 1826 between the UE 1814 and the base station 1818 is in accordance with the teachings of the embodiments described throughout this disclosure.

One or more of the various embodiments improve the performance of OTT services provided to the UE 1814 using the OTT connection 1816, in which the wireless connection 1826 forms the last segment. More precisely, the teachings of these embodiments may improve throughput and thereby provide benefits such as, e.g., reduced user waiting time, relaxed restriction on file size, etc.

A measurement procedure may be provided for the purpose of monitoring data rate, latency, and other factors on which the one or more embodiments improve. There may further be an optional network functionality for reconfiguring the OTT connection 1816 between the host computer 1802 and the UE 1814, in response to variations in the measurement results. The measurement procedure and/or the network functionality for reconfiguring the OTT connection 1816 may be implemented in the software 1810 and the hardware 1804 of the host computer 1802 or in the software 1840 and the hardware 1834 of the UE 1814, or both. In some embodiments, sensors (not shown) may be deployed in or in association with communication devices through which the OTT connection 1816 passes; the sensors may participate in the measurement procedure by supplying values of the monitored quantities exemplified above, or supplying values of other physical quantities from which the software 1810, 1840 may compute or estimate the monitored quantities. The reconfiguring of the OTT connection 1816 may include message format, retransmission settings, preferred routing, etc.; the reconfiguring need not affect the base station 1818, and it may be unknown or imperceptible to the base station 1818. Such procedures and functionalities may be known and practiced in the art. In certain embodiments, measurements may involve proprietary UE signaling facilitating the host computer's 1802 measurements of throughput, propagation times, latency, and the like. The measurements may be implemented in that the software 1810 and 1840 causes messages to be transmitted, in particular empty or 'dummy' messages, using the OTT connection 1816 while it monitors propagation times, errors, etc.

FIG. 19 is a flowchart illustrating a method implemented in a communication system, in accordance with one embodiment. The communication system includes a host computer, a base station, and a UE which may be those described with reference to FIGS. 17 and 18. For simplicity of the present disclosure, only drawing references to FIG. 19 will be included in this section. In step 1900, the host computer provides user data. In sub-step 1902 (which may be optional) of step 1900, the host computer provides the user data by executing a host application. In step 1904, the host computer initiates a transmission carrying the user data to the UE. In step 1906 (which may be optional), the base station transmits to the UE the user data which was carried in the transmission that the host computer initiated, in accordance with the teachings of the embodiments described throughout this disclosure. In step 1908 (which may also be optional), the UE executes a client application associated with the host application executed by the host computer.

FIG. 20 is a flowchart illustrating a method implemented in a communication system, in accordance with one embodiment. The communication system includes a host computer, a base station, and a UE which may be those described with reference to FIGS. 17 and 18. For simplicity of the present disclosure, only drawing references to FIG. 20 will be included in this section. In step 2000 of the method, the host computer provides user data. In an optional sub-step (not shown) the host computer provides the user data by executing a host application. In step 2002, the host computer initiates a transmission carrying the user data to the UE. The transmission may pass via the base station, in accordance with the teachings of the embodiments described throughout this disclosure. In step 2004 (which may be optional), the UE receives the user data carried in the transmission.

FIG. 21 is a flowchart illustrating a method implemented in a communication system, in accordance with one embodiment. The communication system includes a host computer, a base station, and a UE which may be those described with reference to FIGS. 17 and 18. For simplicity of the present disclosure, only drawing references to FIG. 21 will be included in this section. In step 2100 (which may be optional), the UE receives input data provided by the host computer. Additionally or alternatively, in step 2102, the UE provides user data. In sub-step 2104 (which may be optional) of step 2100, the UE provides the user data by executing a client application. In sub-step 2106 (which may be optional) of step 2102, the UE executes a client application which provides the user data in reaction to the received input data provided by the host computer. In providing the user data, the executed client application may further consider user input received from the user. Regardless of the specific manner in which the user data was provided, the UE initiates, in sub-step 2108 (which may be optional), transmission of the user data to the host computer. In step 2110 of the method, the host computer receives the user data transmitted from the UE, in accordance with the teachings of the embodiments described throughout this disclosure.

FIG. 22 is a flowchart illustrating a method implemented in a communication system, in accordance with one embodiment. The communication system includes a host computer, a base station, and a UE which may be those described with reference to FIGS. 17 and 18. For simplicity of the present disclosure, only drawing references to FIG. 22 will be included in this section. In step 2200 (which may be optional), in accordance with the teachings of the embodiments described throughout this disclosure, the base station receives user data from the UE. In step 2202 (which may be optional), the base station initiates transmission of the received user data to the host computer. In step 2204 (which may be optional), the host computer receives the user data carried in the transmission initiated by the base station.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include Digital Signal Processors (DSPs), special-purpose digital logic, and the like. The processing circuitry may be configured to execute program code stored in memory, which may include one or several types of memory such as Read Only Memory (ROM), Random Access Memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

While processes in the figures may show a particular order of operations performed by certain embodiments of the present disclosure, it should be understood that such order is exemplary (e.g., alternative embodiments may perform the operations in a different order, combine certain operations, overlap certain operations, etc.).

At least some of the following abbreviations may be used in this disclosure. If there is an inconsistency between abbreviations, preference should be given to how it is used above. If listed multiple times below, the first listing should be preferred over any subsequent listing(s).

2D Two-Dimensional
3GPP Third Generation Partnership Project
4G Fourth Generation
5G Fifth Generation
5GS Fifth Generation System
AAS Active Antenna System
AP Access Point
ASIC Application Specific Integrated Circuit
CPU Central Processing Unit
CQI Channel Quality Information
CSI Channel State Information
CSI-RS Channel State Information Reference Signal
DCI Downlink Control Information
DFT Discrete Fourier Transform
DL Downlink
DMRS Demodulation Reference Signal
DSP Digital Signal Processor
eNB Enhanced or Evolved Node B
FD-MIMO Full Dimension Multiple Input Multiple Output
FPGA Field Programmable Gate Array
gNB New Radio Base Station
GoB Grid-of-Beams
ID Identifier
LTE Long Term Evolution
MIMO Multiple Input Multiple Output
MME Mobility Management Entity
MTC Machine Type Communication
NG Next Generation
NR New Radio
OTT Over-the-Top
PDSCH Physical Downlink Shared Channel
P-GW Packet Data Network Gateway
PMI Precoding Matrix Indication
PRB Physical Resource Block
PUSCH Physical Uplink Shared Channel
RAM Random Access Memory
RAN Radio Access Network
RMS Root Mean Squared
ROM Read Only Memory
RRC Radio Resource Control
RRH Remote Radio Head
SCEF Service Capability Exposure Function
SRS Sounding Reference Signal
UE User Equipment
UL Uplink Those skilled in the art will recognize improvements and modifications to the embodiments of the present disclosure. All such improvements and modifications are considered within the scope of the concepts disclosed herein.

REFERENCES

[1] 3GPP TS 38.211
[2] 3GPP TS 38.214 V15.3.0
[3] 3GPP TS 36.331 V9.6.0
[4] 3GPP TS 38.331 V15.3.0

What is claimed is:

1. A method performed by a base station comprising:
obtaining one or more parameters comprising: (a) one or more measurements of channel dispersiveness of a wireless channel between the base station and a User Equipment, UE, (b) an uplink power-limited status of the UE, (c) an allocation bandwidth for the UE, or a combination of two or more of (a), (b), and (c);
selecting, based on the one or more parameters, a Channel State Information, CSI, report configuration for the UE, a Physical Resource Block, PRB, bundling configuration for the UE, or both the CSI report configuration for the UE and the PRB bundling configuration for the UE; and
transmitting, to the UE, information that indicates the selected CSI report configuration, information that indicates the selected PRB bundling configuration, or both the information that indicates the selected CSI report configuration and the information that indicates the selected PRB bundling configuration, wherein:
the one or more parameters comprise one or more measurements of channel dispersiveness of the wireless channel; and
the one or more measurements of the channel dispersiveness of the wireless channel comprise a measurement of a long-term channel dispersiveness of the wireless channel, a measurement of instantaneous channel dispersiveness of the wireless channel, or both a measurement of a long-term channel dispersiveness of the wireless channel and a measurement of instantaneous channel dispersiveness of the wireless channel.

2. The method of claim 1 wherein:
the one or more parameters further comprise the uplink power-limited status of the UE; and
selecting the CSI report configuration for the UE, the PRB bundling configuration for the UE, or both the CSI report configuration for the UE and the PRB bundling configuration for the UE comprises:
determining that the UE is uplink power-limited based on the uplink power-limited status of the UE; and
upon determining that the UE is uplink power-limited, selecting wideband CSI reporting for the CSI report configuration.

3. The method of claim 1 wherein:
the one or more parameters further comprise the uplink power-limited status of the UE and a timer for subband reporting; and
selecting the CSI report configuration for the UE, the PRB bundling configuration for the UE, or both the CSI report configuration for the UE and the PRB bundling configuration for the UE comprises:
determining that the UE is not uplink power-limited based on the uplink power-limited status of the UE;
determining that the measurement of the channel dispersiveness of the wireless channel is less than a predefined or preconfigured threshold;
determining that the timer for subband reporting has not expired; and
upon determining that the UE is not uplink power-limited, determining that the measurement of the channel dispersiveness of the wireless channel is less than the predefined or preconfigured threshold, and determining that the timer for subband reporting has not expired, selecting wideband CSI reporting for the CSI report configuration.

4. The method of claim 1 wherein:
the one or more parameters further comprise the uplink power-limited status of the UE; and
selecting the CSI report configuration for the UE, the PRB bundling configuration for the UE, or both the CSI report configuration for the UE and the PRB bundling configuration for the UE comprises:
  determining that the UE is not uplink power-limited based on the uplink power-limited status of the UE;
  determining that the measurement of the channel dispersiveness of the wireless channel is not less than a predefined or preconfigured threshold; and
  determining that the UE is not uplink power-limited based on the uplink power-limited status of the UE;
  determining that the measurement of the channel dispersiveness of the wireless channel is not less than a predefined or preconfigured threshold; and
  upon determining that the UE is not uplink power-limited and determining that the measurement of the channel dispersiveness of the wireless channel is not less than the predefined or preconfigured threshold, selecting subband CSI reporting for the CSI report configuration.

5. The method of claim 1 wherein:
the one or more parameters further comprise the uplink power-limited status of the UE and a timer for subband reporting; and
selecting the CSI report configuration for the UE, the PRB bundling configuration for the UE, or both the CSI report configuration for the UE and the PRB bundling configuration for the UE comprises:
  determining that the UE is not uplink power-limited based on the uplink power-limited status of the UE;
  determining that the measurement of the channel dispersiveness of the wireless channel is less than a predefined or preconfigured threshold;
  determining that the timer for subband reporting has expired; and
  upon determining that the UE is not uplink power-limited, determining that the measurement of the channel dispersiveness of the wireless channel is less than the predefined or preconfigured threshold, and determining that the timer for subband reporting has expired, selecting subband CSI reporting for the CSI report configuration.

6. The method of claim 1 wherein:
the UE is a UE for which the base station has scheduled a downlink transmission having a corresponding allocation bandwidth;
the one or more parameters further comprise the corresponding allocation bandwidth; and
selecting the CSI report configuration for the UE, the PRB bundling configuration for the UE, or both the CSI report configuration for the UE and the PRB bundling configuration for the UE comprises:
  determining that the corresponding allocation bandwidth is greater than a first predefined or preconfigured threshold;
  determining that the measurement of the channel dispersiveness is available;
  determining that the measurement of the channel dispersiveness of the wireless channel is less than a second predefined or preconfigured threshold; and
  upon determining that the corresponding allocation bandwidth is greater than the first predefined or preconfigured threshold, determining that the measurement of the channel dispersiveness is available, and determining that the measurement of the channel dispersiveness of the wireless channel is less than the second predefined or preconfigured threshold, selecting wideband PRB bundling.

7. The method of claim 6 further comprising applying one of two or more subband Precoding Matrix Indications, PMIs, in a previous PMI reported by the UE as a wideband PMI for the downlink transmission to the UE.

8. The method of claim 1 wherein:
the UE is a UE for which the base station has scheduled a downlink transmission having a corresponding allocation bandwidth;
the one or more parameters further comprise the corresponding allocation bandwidth; and
selecting the CSI report configuration for the UE, the PRB bundling configuration for the UE, or both the CSI report configuration for the UE and the PRB bundling configuration for the UE comprises:
  determining that the corresponding allocation bandwidth is greater than a first predefined or preconfigured threshold;
  determining that the measurement of the channel dispersiveness is available;
  determining that the measurement of the channel dispersiveness of the wireless channel is not less than a second predefined or preconfigured threshold; and
  upon determining that the corresponding allocation bandwidth is greater than the first predefined or preconfigured threshold, determining that the measurement of the channel dispersiveness is available, and determining that the measurement of the channel dispersiveness of the wireless channel is not less than the second predefined or preconfigured threshold, selecting subband PRB bundling.

9. The method of claim 1 wherein:
the UE is a UE for which the base station has scheduled a downlink transmission having a corresponding allocation bandwidth;
the one or more parameters further comprise the corresponding allocation bandwidth; and
selecting the CSI report configuration for the UE, the PRB bundling configuration for the UE, or both the CSI report configuration for the UE and the PRB bundling configuration for the UE comprises:
  determining that the corresponding allocation bandwidth is greater than a first predefined or preconfigured threshold;
  determining that the measurement of the channel dispersiveness is not available; and
  upon determining that the corresponding allocation bandwidth is greater than the first predefined or preconfigured threshold and determining that the measurement of the channel dispersiveness is not available, selecting wideband PRB bundling.

10. The method of claim 1 wherein:
the UE is a UE for which the base station has scheduled a downlink transmission having a corresponding allocation bandwidth;
the one or more parameters further comprise the corresponding allocation bandwidth; and
selecting the CSI report configuration for the UE, the PRB bundling configuration for the UE, or both the CSI report configuration for the UE and the PRB bundling configuration for the UE comprises:
  determining that the corresponding allocation bandwidth is not greater than a first predefined or preconfigured threshold; and upon determining that the corresponding allocation bandwidth is not greater than the first predefined or preconfigured threshold, selecting wideband PRB bundling.

11. The method of claim 10 wherein a previous Precoding Matrix Indication, PMI, report from the UE is a subband PMI report, and the method further comprises applying one of two or more subband PMIs in the previous PMI reported by the UE as a wideband PMI for the downlink transmission to the UE.

12. The method of claim 1 wherein:
the UE is a UE for which the base station has scheduled a downlink transmission having a corresponding allocation bandwidth;
the one or more parameters further comprise the corresponding allocation bandwidth; and
selecting the CSI report configuration for the UE, the PRB bundling configuration for the UE, or both the CSI report configuration for the UE and the PRB bundling configuration for the UE comprises:
determining that the corresponding allocation bandwidth is not greater than a first predefined or preconfigured threshold;
determining that the channel dispersiveness of the wireless channel is less than a predefined or preconfigured threshold; and
upon determining that the corresponding allocation bandwidth is not greater than the first predefined or preconfigured threshold and determining that the channel dispersiveness of the wireless channel is less than the predefined or preconfigured threshold, selecting wideband PRB bundling.

13. The method of claim 12 wherein a previous Precoding Matrix Indication, PMI, report from the UE is a subband PMI report, and the method further comprises applying one of two or more subband PMIs in the previous PMI reported by the UE as a wideband PMI for the downlink transmission to the UE.

14. The method of claim 1 wherein:
the UE is a UE for which the base station has scheduled a downlink transmission having a corresponding allocation bandwidth;
the one or more parameters further comprise the corresponding allocation bandwidth; and
selecting the CSI report configuration for the UE, the PRB bundling configuration for the UE, or both the CSI report configuration for the UE and the PRB bundling configuration for the UE comprises:
determining that the corresponding allocation bandwidth is not greater than a first predefined or preconfigured threshold;
determining that the channel dispersiveness of the wireless channel is not less than a predefined or preconfigured threshold; and
upon determining that the corresponding allocation bandwidth is not greater than the first predefined or preconfigured threshold and determining that the channel dispersiveness of the wireless channel is not less than the predefined or preconfigured threshold, selecting subband PRB bundling.

15. The method of claim 1 wherein:
the one or more measurements of the channel dispersiveness of the wireless channel comprise a measurement of a long-term channel dispersiveness of the wireless channel; and obtaining the one or more parameters comprises obtaining the measurement of the long-term channel dispersiveness of the wireless channel based on:
subband Precoding Matrix Indication, PMI, reports received from the UE;
subband Channel Quality Information, CQI, reports received from the UE;
or
measurements of uplink transmissions from the UE, the uplink transmissions comprising: Sounding Reference Signals, SRSs, from the UE, Demodulation Reference Signals, DMRSs, from the UE, or beam transmissions from the UE.

16. The method of claim 1 wherein:
the one or more measurements of the channel dispersiveness of the wireless channel comprise a measurement of a long-term channel dispersiveness of the wireless channel; and
obtaining the one or more parameters comprises obtaining the measurement of the long-term channel dispersiveness of the wireless channel; and
obtaining the measurement of the long-term channel dispersiveness of the wireless channel comprises:
computing, within a defined time window, two or more Root Mean Squared, RMS, subband Precoding Matrix Indication, PMI, values from corresponding subband PMI values reported by the UE across a full carrier bandwidth; and
averaging the two or more RMS subband PMI values to provide an averaged RMS subband PMI value, the averaged RMS subband PMI value being the measurement of the long-term channel dispersiveness of the wireless channel.

17. The method of claim 1 wherein:
the one or more measurements of the channel dispersiveness of the wireless channel comprise a measurement of a long-term channel dispersiveness of the wireless channel; and
obtaining the one or more parameters comprises obtaining the measurement of the long-term channel dispersiveness of the wireless channel; and
obtaining the measurement of the long-term channel dispersiveness of the wireless channel comprises:
computing a variation of subband Precoding Matrix Indications, PMIs, reported by the UE, the variation of the subband PMIs being the measurement of the long-term channel dispersiveness of the wireless channel.

18. The method of claim 1 wherein the UE is a UE for which the base station has scheduled a downlink transmission having a corresponding allocation bandwidth.

19. The method of claim 18 wherein the one or more parameters comprise the one or more measurements of the channel dispersiveness of the wireless channel and the corresponding allocation bandwidth.

20. The method of claim 19 wherein the one or more measurements of the channel dispersiveness of the wireless channel comprise a measurement of an instantaneous channel dispersiveness of the wireless channel across the corresponding allocation bandwidth.

21. The method of claim 20 wherein obtaining the one or more parameters comprises obtaining the measurement of the instantaneous channel dispersiveness of the wireless channel across the corresponding allocation bandwidth based on:
a subband PMI report received from the UE;
a subband Channel Quality Information, CQI, report received from the UE; or measurements of uplink transmissions from the UE, the uplink transmissions comprising: Sounding Reference Signals, SRSs, from the UE, Demodulation Reference Signals, DMRSs, from the UE, or beam transmissions from the UE.

22. The method of claim 20 wherein obtaining the one or more parameters comprises obtaining the measurement of the instantaneous channel dispersiveness of the wireless channel across the corresponding allocation bandwidth, and obtaining the measurement of the instantaneous channel dispersiveness of the wireless channel across the corresponding allocation bandwidth comprises:
    computing a Root Mean Squared, RMS, subband PMI value from subband PMI values reported by the UE for subbands within the corresponding allocation bandwidth, the RMS subband PMI value being the measurement of the instantaneous channel dispersiveness of the wireless channel across the corresponding allocation bandwidth.

23. The method of claim 18 wherein the one or more parameters comprise the one or more measurements of the channel dispersiveness of the wireless channel, the corresponding allocation bandwidth, and the uplink power-limited status of the UE.

24. A base station configured to communicate with a User Equipment, UE, the base station comprising:
    processing circuitry; and
    memory coupled to the processing circuitry and having instructions stored therein that are executable by the processing circuitry to cause the base station to:
    obtain one or more parameters comprising:
        (a) one or more measurements of channel dispersiveness of a wireless channel between the base station and a UE, (b) an uplink power-limited status of the UE, (c) an allocation bandwidth for the UE, or a combination two or more of (a), (b), and (c);
    select, based on the one or more parameters, a Channel State Information, CSI, report configuration for the UE, a Physical Resource Block, PRB, bundling configuration for the UE, or both the CSI report configuration for the UE and the PRB bundling configuration for the UE; and
    transmit, to the UE, information that indicates the selected CSI report configuration, information that indicates the selected PRB bundling configuration, or both the information that indicates the selected CSI report configuration and the information that indicates the selected PRB bundling configuration,
    wherein:
    the one or more parameters comprise one or more measurements of channel dispersiveness of the wireless channel; and
    the one or more measurements of the channel dispersiveness of the wireless channel comprise a measurement of a long-term channel dispersiveness of the wireless channel, a measurement of instantaneous channel dispersiveness of the wireless channel, or both a measurement of a long-term channel dispersiveness of the wireless channel and a measurement of instantaneous channel dispersiveness of the wireless channel.

25. The base station of claim 24 comprising:
a network interface; and
the processing circuitry associated with the network interface, the processing circuitry configured to cause the base station to:
    obtain the one or more parameters;
    select, based on the one or more parameters, a CSI report configuration for the UE, a PRB bundling configuration for the UE, or both the CSI report configuration for the UE and the PRB bundling configuration for the UE; and
    transmit, to the UE, information that indicates the selected CSI report configuration, information that indicates the selected PRB bundling configuration, or
    both the information that indicates the selected CSI report configuration and the information that indicates the selected PRB bundling configuration.

* * * * *